United States Patent
Li et al.

(10) Patent No.: US 12,361,560 B2
(45) Date of Patent: Jul. 15, 2025

(54) BLOOD SMEAR FULL-VIEW INTELLIGENT ANALYSIS METHOD, AND BLOOD CELL SEGMENTATION MODEL AND RECOGNITION MODEL CONSTRUCTION METHOD

(71) Applicant: BEIJING XIAOYING TECHNOLOGY CO., LTD., Beijing (CN)

(72) Inventors: Bairui Li, Beijing (CN); Heqing Lian, Beijing (CN); Zhejun Fang, Beijing (CN); Dongqi Lyu, Beijing (CN)

(73) Assignee: BEIJING XIAOYING TECHNOLOGY CO., LTD., Beijing (CN)

( * ) Notice: Subject to any disclaimer, the term of this patent is extended or adjusted under 35 U.S.C. 154(b) by 524 days.

(21) Appl. No.: 17/762,780

(22) PCT Filed: Nov. 27, 2020

(86) PCT No.: PCT/CN2020/132018
§ 371 (c)(1),
(2) Date: Mar. 23, 2022

(87) PCT Pub. No.: WO2021/104410
PCT Pub. Date: Jun. 3, 2021

(65) Prior Publication Data
US 2022/0343623 A1 Oct. 27, 2022

(30) Foreign Application Priority Data

Nov. 28, 2019 (CN) .......................... 201911186777.0
Nov. 28, 2019 (CN) .......................... 201911186888.1
Nov. 28, 2019 (CN) .......................... 201911186889.6

(51) Int. Cl.
*G06T 7/11* (2017.01)
*G06F 18/214* (2023.01)
*G06V 10/26* (2022.01)

(52) U.S. Cl.
CPC .............. *G06T 7/11* (2017.01); *G06F 18/214* (2023.01); *G06V 10/26* (2022.01); *G06T 2207/20081* (2013.01); *G06T 2207/20084* (2013.01)

(58) Field of Classification Search
CPC .............. G06T 7/11; G06T 5/60; G06V 10/82
See application file for complete search history.

(56) References Cited

U.S. PATENT DOCUMENTS 11,830,188 B2 * 11/2023 Ohsaka ................ G06V 10/764
2002/0186875 A1 12/2002 Burmer et al.
(Continued)

FOREIGN PATENT DOCUMENTS

AU 2002344285 12/2002
CN 109308695 A 2/2019
(Continued)

OTHER PUBLICATIONS

Le Yu, Research on Segmentation and Recognition of Microscopic Leucocytes Image. ISSN: 1674-0246. May 15, 2013.

*Primary Examiner* — Benjamin O Dulaney
(74) *Attorney, Agent, or Firm* — IPro, PLLC

(57) ABSTRACT

A blood smear full-view intelligent analysis method, and a blood cell segmentation model and recognition model construction method. The analysis method comprises: collecting a plurality of original blood smear single-view images, establishing an original blood smear single-view image group, and establishing a blood smear full-view image on the basis of the plurality of original blood smear single-view images; constructing an image restoration model on the basis of a first training set and a first verification set; constructing an image segmentation model on the basis of a second training set and a second verification set, obtaining a third training set and a third verification set on the basis of a plurality of segmented individual blood cell images, and constructing an image recognition model; and finally obtaining a blood cell classification result. According to the method, full-view blood cells are analyzed on the basis of an artificial intelligence algorithm, thereby greatly reducing (Continued)

interference of human factors, improving objectivity of an inspection result, and improving blood cell analysis and classification accuracy; recognition and analysis can be realized for picture input meeting requirements, the algorithm robustness and accuracy are higher than those of conventional image recognition algorithms, and the overall time is greatly shortened.

5 Claims, 13 Drawing Sheets

(56)  References Cited

U.S. PATENT DOCUMENTS

| | | | |
|---|---|---|---|
| 2020/0160032 A1* | 5/2020 | Allen | G16H 50/30 |
| 2020/0256856 A1* | 8/2020 | Chou | B01L 3/508 |
| 2021/0333196 A1* | 10/2021 | Mundhra | G06V 20/695 |
| 2022/0206007 A1* | 6/2022 | Li | G01J 3/10 |

FOREIGN PATENT DOCUMENTS

| | | | |
|---|---|---|---|
| CN | 110032985 A | 7/2019 | |
| CN | 110647874 A | 1/2020 | |
| CN | 110647875 A | 1/2020 | |
| CN | 110647876 A | 1/2020 | |
| EP | 1380005 A1 | 1/2004 | |
| JP | 2004535569 A | 11/2004 | |
| WO | 02097714 A1 | 12/2002 | |

* cited by examiner

Normal white blood cell
    Segmented neutrophil (4)
Other cells
    Abnormal cell (4)
    Smear cell (2)

White blood cell form labeling subsystem

BLOOD SMEAR FULL-VIEW INTELLIGENT ANALYSIS METHOD, AND BLOOD CELL SEGMENTATION MODEL AND RECOGNITION MODEL CONSTRUCTION METHOD

CROSS-REFERENCE TO RELATED APPLICATIONS

The present application is proposed based on Chinese patent applications with the application numbers of 2019111868881, 2019111868896 and 2019111867770 and the application date of Nov. 28, 2019, and claims the priority of the Chinese patent applications, the disclosures of which are hereby incorporated by reference.

TECHNICAL FIELD

Embodiments of the present invention relate to the technical field of blood cell analysis, in particular to a blood smear full-view intelligent analysis method, and blood cell segmentation model and recognition model construction method.

BACKGROUND

In the current blood cell testing technology, the recognition rate of blood cells is low and human interference factors are large. The existing instrument and equipment fail to analyze the full view of blood smears, and the accuracy of the testing results is not high. At present, the blood test process in the hospital is: blood samples-blood analyzer-pushing and staining machine-manual microscopy, and the whole process takes 60 minutes. Blood is drawn manually from a patient to obtain a blood sample; various blood cell counts, white blood cell classification, and hemoglobin content are obtained through a blood analyzer; staining and labeling are conducted with the pushing and staining machine to obtain a blood smear for artificial microscope morphological examination; and finally, microscopy is conducted by a professional doctor to obtain the morphological analysis results of blood cells from manual analysis, including abnormal blood cell counts, abnormal blood cell classification, and the like. The technologies of the existing blood analyzers (hematocrit, globulimeter and the like) are mainly realized based on three types: resistance method, laser measurement and comprehensive methods (flow cytometry, cytochemical staining, special cytoplasmic division and the like).

The resistance method is a physical method. The blood is diluted in a certain proportion and then sucked under negative pressure to pass through a microporous tube of an instrument. Since blood cells are poor conductors compared with the diluent, each blood cell replaces the equal volume of diluent when passing through micropores to form a transient resistance on a circuit to cause the change of voltage; and corresponding pulse signals are generated, which are amplified and discriminated, and then accumulated and recorded. Analytical equipment using this principle often causes blockage of the microporous tube to different degrees, causing large fluctuation in the results of differential blood count. In the laser measurement method, the blood is diluted in a certain proportion to form a very thin liquid stream that passes through the laser beam, and each blood cell is irradiated by the laser to scatter light which is received by a photomultiplier tube. The forward angle scattering of cells is related to the size of the cell volume, the side angle (or high angle) scattering is related to the internal structure of the cells and the nature of particles, and the number of the cells is the same as the number of pulses from light scattering when the cells pass through the laser beam. After various detection signals are amplified, discriminated and processed by a computer, the number and the average volume of various blood cells, coefficients of variation, percentage of whole blood volume, and volume size distribution histograms can be obtained. Although a laser instrument is more stable than a resistance instrument, the life of the laser tube is limited, and the types of white blood cells measured are limited. Comprehensive methods: such instruments are highly comprehensive application of a variety of advanced cell analysis techniques, and have more analysis parameters for the blood cells, but the objectivity of the inspection results is insufficient and the accuracy is not high, thereby failing to completely replace manual microscopy.

In the prior art, the efficiency of morphological examination is too inefficient and too much subjective factors lie in the identification process, making it extremely easy to be disturbed by subjective experience and human factors. Firstly, the analysis and counting of the blood cells within the full view of the blood smear are not realized, and the number of data samples is not enough, causing that the results are not comprehensive; secondly, the counting and classification algorithms are traditional, morphological analysis is inefficient, and the accuracy is not high; thirdly, the subjectivity of manual microscopy physicians cannot be controlled, and the retest rate is high; and fourthly, the time is long and the efficiency is low.

SUMMARY

The purpose of the invention is to provide a blood smear full-view intelligent analysis method, and blood cell segmentation model and classification model construction method for blood cell morphological recognition and quantitative analysis in the field of blood routine examination. Full-view photography is conducted for a plurality of blood smears by using a blood smear scanner or microphotographic system to obtain a plurality of blood smear images, thereby establishing a of blood smear image dataset. Training data sets and validation data sets are prepared for the work of three parts of image restoration, image segmentation and image recognition from the blood smear image dataset. Models are trained using artificial intelligence techniques (deep learning and convolutional neural networks) and optimized by constant parameter optimization and error analysis to finally obtain a mature image restoration model, image segmentation model and image recognition model for deployment. In the process of system application, the blood smear to detect also needs the full-view photography through the blood smear scanner or the microphotographic system to establish a blood smear scanning image. After the image restoration model, a clear restored blood image is obtained and then processed by the image segmentation model to obtain a single blood cell image. Finally, the blood cell image is classified and output a report. Generate high accuracy with full-view scanning.

The present invention adopts the following technical solution:

A blood smear full-view intelligent analysis method, comprises the following steps: collecting a plurality of original blood smear single-view images, establishing an original single-view image group, and establishing a full-view image based on the plurality of original single-view images;

obtaining a first training set and a first validation set based on the plurality of original single-view images, and constructing an image restoration model based on the first training set and the first validation set;

selecting the original single-view images in which white blood cells exist and the white blood cells and red blood cells do not overlap from the plurality of original single-view images to obtain a second training set and a second validation set, constructing an image segmentation model based on the second training set and the second validation set, processing the plurality of original blood smear single-view images in which white blood cells exist and the white blood cells and red blood cells do not overlap by the image segmentation model to obtain a plurality of segmented single blood cell images;

obtaining a third training set and a third validation set based on the plurality of segmented single blood cell images, and constructing an image recognition model based on the third training set and the third validation set;

restoring the blood smear full-view image by an image restoration model to obtain a restored full-view image, processing the restored full-view image by the image segmentation model to obtain a plurality of single blood cell images, and processing the plurality of single blood cell images by the image recognition model to obtain a blood cell classification result.

Further, the step of selecting the original single-view images in which white blood cells exist and the white blood cells and red blood cells do not overlap from the plurality of original blood smear single-view images to obtain a second training set and a second validation set, constructing an image segmentation model based on the second training set and the second validation set, processing the plurality of original blood smear single-view images in which white blood cells exist and the white blood cells and red blood cells do not overlap by the image segmentation model to obtain a plurality of segmented single blood cell images comprises:

step S310, outputting certain original single-view image data in the second training set into a convolutional block of a second convolutional neural network by an input layer of the second convolutional neural network;

step S320, setting the number of convolutional blocks of an encoding structure of the second convolutional neural network, the number of convolutional layers of each convolutional block, the number of pooling layers of each convolutional block, the number and size of convolutional kernels of each convolutional layer, and the number and size of the convolutional kernels of each pooling layer, and extracting first key features;

step S330, setting the number of convolutional blocks of a decoding structure same with the number of convolutional blocks of the encoding structure, making the number and size of convolutional kernels of convolutional layers of each convolutional block of the decoding structure, the number of pooling layers of each convolutional block of the decoding structure and the number of convolutional kernels of each pooling layer of the decoding structure consistent with the corresponding convolutional blocks in the encoding structure, and obtaining decoded data based on the first key features;

step S340, performing convolution computation on the decoded data, making the size of convolutional kernels of the convolution computation as 1, and setting the number of the convolutional kernels as the number of types to be segmented;

step S350, fully connecting the decoded data subjected to the convolution computation with a plurality of neurons in an output layer of the second convolutional neural network by a fully connected layer of each convolutional block of the second convolutional neural network; and outputting a predicted segmentation result by the output layer of the second convolutional neural network;

step S360, repeating steps S310 to S350, using the second training set for training, and obtaining the image segmentation model through iterative parameter adjustment.

Further, the step of obtaining a third training set and a third validation set based on the plurality of segmented single blood cell images, and constructing an image recognition model based on the third training set and the third validation set comprises:

step S410, outputting certain segmented single blood cell image data in the third training set into a convolutional block of a third convolutional neural network by an input layer of the third convolutional neural network;

step S420, setting the number of convolutional blocks of the third convolutional neural network, the number of convolutional layers of each convolutional block, the number of pooling layers of each convolutional block, the number and size of convolutional kernels of each convolutional layer, and the number and size of the convolutional kernels of each pooling layer, and extracting second key features;

step S430, fully connecting the second key features with a plurality of neurons in an output layer of the third convolutional neural network by a fully connected layer of each convolutional block of the third convolutional neural network; and outputting a predicted recognition result by the output layer of the third convolutional neural network;

step S440, repeating steps S410 to S430, using the third training set for training, and obtaining the image recognition model through iterative parameter adjustment.

Further, the size of the convolutional kernel in each convolutional layer of the encoding structure of the second convolutional neural network is the same, the number of the convolutional kernels of each convolutional layer of a next convolutional block of the encoding structure is twice the number of the convolutional kernels of each convolutional layer of a previous convolutional block, the number of the pooling layers of each convolutional block of the encoding structure is the same, and the number and size of the convolutional kernels of each pooling layer of the encoding structure are the same.

Further, the size of the convolutional kernel in each convolutional layer of the decoding structure of the second convolutional neural network is the same, the number of the convolutional kernels of each convolutional layer of a next convolutional block of the decoding structure is ½ times of the number of the convolutional kernels of each convolutional layer of a previous convolutional block, the number of the pooling layers of each convolutional block of the decoding structure is the same, and the number and size of the convolutional kernels of each pooling layer of the decoding structure are the same.

The present invention provides a blood smear full-view intelligent analysis method, comprising: collecting a plurality of original blood smear single-view images, establishing an original blood smear single-view image group, and establishing a blood smear full-view image based on the plurality of original blood smear single-view images; constructing an image restoration model based on the first training set and the first validation set; constructing an image segmentation model based on the second training set and the second validation set; obtaining the third training set and the third validation set based on the plurality of segmented single blood cell images; constructing an image recognition model; and finally obtaining a blood cell classification result.

Compared with the prior art, the blood smear full-view intelligent analysis method provided by embodiments of the present invention realize selection and open update of artificial intelligence algorithms according to different application fields. The blood cells are analyzed in the full view on the basis of artificial intelligence algorithms, thereby greatly reducing the interference of human factors and enhancing the objectivity of inspection results, with high accuracy of blood cell analysis and classification. For image inputs that meet the requirements, recognition and analysis can be achieved. robustness and accuracy of the algorithms are higher than those of the traditional image recognition algorithms; the existing medical inspection process is overturned; and the whole time will be greatly reduced.

Embodiments of the present invention provide a blood cell segmentation model and classification model construction method. The blood smear is accurately scanned and analyzed by constructing the blood cell segmentation model and recognition model to enhance comprehensiveness and accuracy of blood cell recognition.

The method comprises:
  acquiring a plurality of single-view images of each blood smear in at least one blood smear, splicing the plurality of single-view images of each blood smear to form a full-view image to form a full-view image database and conducting manual image segmentation on each full-view image in the full-view image database to obtain single blood cell images which converge to form an initial blood cell image database;
  manually labeling the single blood cell images in the initial blood cell image database to form a labeled blood cell image database;
  constructing a blood cell segmentation model and a blood cell recognition model, selecting samples from the initial blood cell image database to form a training set and a validation set, and training the blood cell segmentation model until the requirements for the segmentation accuracy of single blood cells are satisfied; selecting samples from the labeled blood cell image database to form a training set and a validation set, and training the blood cell recognition model until the requirements for recognition accuracy are satisfied.

Further, splicing modes comprise: mode 1, extracting feature points of single-view images that are physically adjacent in pairs, and then matching image features to finally form a complete full-view image; or mode 2, judging the size of the overlapped regions of two adjacent single-view images, then performing weighted average on the overlapped parts to obtain the image of the overlapped parts, and finally obtaining the full-view image.

Further, the method of manual labeling is to label the white blood cell and/or red blood cell type and image clarity at a computer or mobile phone terminal and conduct cross-validation on labeling results.

Further, the blood cell recognition model is constructed by a feedforward neural network with deep structure.

Further, the feedforward neural network with deep structure uses the convolutional layers to extract the feature vectors of various cells, extracts the required feature vectors through max pooling, conducts residual learning with residual blocks, and classifies and outputs type information through two fully connected layers;
  residual block input is subjected to 3*3 convolution, activated by a first Relu activation function, and then subjected to 3*3 convolution and superimposed with the input, and finally activated by a second Relu activation function and outputted.

Further, the blood cell segmentation model is constructed by a method of normalization, color space conversion, histogram averaging or deep learning.

Further, the method of deep learning comprises, but not limited to YOLO, SSD or DenseBox.

In another aspect, the present invention provides a method for recognizing blood cells, comprising:
  constructing a blood cell segmentation model and a blood cell recognition model using the blood cell segmentation model and recognition model construction method;
  performing image segmentation on a single-view slide scanning image by using the blood cell segmentation model to obtain a single blood cell image and corresponding position;
  recognizing the cell types of the single blood cells by using the blood cell recognition model;
  labeling the single-view slide scanning image based on the positions and the types of the single blood cells.

Further, the blood cell segmentation model also comprises determining a segmentation view range before performing image segmentation on the single view slide scanning image, and the segmentation view range comprises specific regions ideal for imaging, important parts with more blood cells and/or doctor-designated regions.

The method further comprises manually assessing the segmentation and recognition results of the blood cell segmentation model and the blood cell recognition model, reversely transmitting a gradient according to the assessment results and optimizing the blood cell segmentation model and the blood cell recognition model.

Compared with the prior art, blood cell segmentation model and recognition model construction method provided by embodiments of the present invention has the following advantages:

(1) The blood cell segmentation model and classification model of the present invention are open-ended and can realize selection and open update of artificial intelligence algorithms according to different application fields, and have good universality so that recognition and analysis can be realized for the image input which conforms to the requirements of software systems;

(2) The blood cell segmentation model and recognition model of the present invention have intelligence. Software algorithms have self-learning properties. With the increase of high-quality labeling images, the training efficiency of the recognition model is gradually improved, which can continuously optimize the accuracy of software recognition and classification.

(3) The present invention realizes full-view blood cell analysis by the computer, which avoids the loss of marginal blood cells, greatly reduces the interference of human objective factors and improves the objectivity and consistency of inspection results.

(4) The present invention generates the blood image database based on the full-view images and trains the blood cell segmentation model, thereby ensuring the accuracy and comprehensiveness of sample data and improving the segmentation accuracy of the blood cell segmentation model.

(5) The present invention generates the sample database based on the full-view images to avoid missing marginal incomplete cells at the single view. In addition, because the patent can quickly and accurately locate and identify the blood cells, the accuracy and high efficiency of the analysis of all blood cells (thousands of blood cells to hundred thousand blood cells) in the full-view image can be ensured. At the same time, the instance segmentation recognition model of the blood cells is trained to improve the accuracy and comprehensiveness of the sample data and improve the accuracy of recognition and labeling.

Embodiments of the present invention provide an end-to-end blood cell recognition model construction method and application. The blood cell recognition model is trained based on the full-view images to realize accurate scanning and analysis of the blood smear, thereby enhancing comprehensiveness and accuracy of blood cell segmentation and recognition. Specifically, based on the full-view images, a data sample set is formed; and the blood cell recognition model is trained with the artificial intelligence technology and optimized by constant parameter optimization and error analysis to finally form the mature recognition model. Model input is a single-view blood smear image, and outputs are all cell positions, edges and types on the image. The present invention realizes full-view blood cell analysis by the computer, which greatly reduces the interference of the human objective factors and improves the objectivity and consistency of the inspection results. algorithms have self-learning properties. With the increase of high-quality labeling images, the training efficiency of the recognition model is gradually improved, which can continuously optimize the accuracy of software recognition and classification. The present invention is realized specifically by the following technical solution:

The present invention provides an end-to-end blood cell recognition model construction method, comprising:
  acquiring a plurality of single-view images of each blood smear, and manually labeling the types and edges of blood cells in each single-view image of each blood smear to form a labeling database example;
  constructing a blood cell recognition model, selecting samples from the labeling database example to form a training set and a validation set, and training the blood cell recognition model until the blood cell recognition model satisfies the requirements for edge segmentation accuracy and type judgment accuracy.

In another aspect, the present invention provides an end-to-end blood cell recognition model construction method, comprising: acquiring a plurality of single-view images of each blood smear in at least one blood smear, splicing the plurality of single-view images of each blood smear to form a full-view image and manually labeling the types and edges of blood cells in each full-view image to form a labeling database example;
  constructing a blood cell recognition model, selecting samples from the labeling database example to form the training set and the validation set, and training the blood cell recognition model until the blood cell recognition model satisfies the requirements for accuracy.

Further, splicing modes comprise: mode 1, extracting feature points of single-view images that are physically adjacent in pairs, and then matching image features to finally form a complete full-view image; or mode 2, judging the size of the overlapped regions of two adjacent single-view images, then performing weighted average on the overlapped parts to obtain the image of the overlapped parts, and finally obtaining the full-view image.

Further, the method of manually labeling the types is to label the types of the white blood cells and/or red blood cells.

Further, the method of manually labeling the edges is to collect cell edge information by a labeler, and generate a document comprising the contour, area and position information of the single blood cell for each image.

Further, the blood cell recognition model adopts a fully-supervised, semi-supervised or unsupervised artificial intelligence algorithm.

Further, the blood cell recognition model adopts a full convolutional neural network; the full convolutional neural network adopts an encoder-decoder structure; the encoder encodes the input images and extracts the features; and the decoder decodes the extracted features and restores image semantics.

Further, the blood cell recognition model firstly conducts encoding computation, inputs a single-view blood smear image, conducts double convolution computations on each layer, extracts shallow features, then performs a max pooling computation, extracts the required features, conducts convolution computation again and increases the number of channels;

The blood cell recognition model conducts decoding computation, firstly conducts a convolution computation to upsample decoding results, then conducts double convolution computations, continues to extract the features, conducts the convolution computation again, connect and transmit shallow layer features to deep layers, and outputs a feature map from a last convolutional layer to obtain a potential region of an object to be segmented; then the blood cell recognition model conducts the convolution operation on the potential region, extracts the features, uses a residual block structure to extract the features of the potential region and transmit the gradient backwards to obtain a finer-grained feature map;

The finer-grained feature map conducts regression and target object classification tasks through a fully connected network, and the output of the last fully connected layer is the coordinate and type information of each pixel of the object to be detected; the mask of the object to be detected is also obtained by Mask algorithm through the convolution of the finer-grained feature map, and then the mask and the type information obtained by the fully connected layer are fused to obtain the result of segmentation example.

Further, the Mask algorithm comprises acquiring the position and edge information corresponding to the finer-grained feature map, conducting full convolutional neural network FCN processing, obtaining the type of each pixel which is a target pixel or a background pixel, conducting residual processing, obtaining a result after gradient transmission, conducting pooling, obtaining a vector after dimension reduction of the features, conducting convolution, and finally obtaining the edge information corresponding to the blood cell at the position.

In another aspect, the present invention provides an end-to-end blood cell segmentation and recognition method, comprising:
  processing each single-view slide scanning image by using the blood cell recognition model constructed by the end-to-end blood cell recognition model construction method to obtain the positions, edges and types of the blood cells in the single-view slide scanning images, and labeling and outputting the single-view slide scanning images.

Further, for the single-view slide scanning images, the segmentation view range is first determined and then processed; the view range comprises a specific region ideal for imaging, important parts with many blood cells and/or doctor-designated regions.

Further, the edge and type labeling results of the blood cell recognition model are manually assessed, the gradient is transmitted reversely according to the assessment results and the blood cell recognition model is optimized;

The blood cell recognition model uses the encoding-decoding architecture to extract the ROI feature map of the blood cell position region, uses a residual network to extract the features of the ROI feature map, and uses a classifier to obtain the coordinate and the type corresponding to the feature map based on the extracted features; and the Mask algorithm obtains the corresponding edge based on the coordinates.

Compared with the prior art, the end-to-end blood cell recognition model construction method provided by embodiments of the present invention has the following advantages:

(1) The blood cell recognition model of the present invention is designed based on artificial intelligence recognition and analysis system architecture and information flow of the neural network, has openness and can realize selection and open update of artificial intelligence algorithms according to different application fields, and has good universality so that recognition and analysis can be realized for the image input which conforms to the requirements of software systems.

(2) The blood cell recognition model of the present invention has intelligence, software algorithms have self-learning properties. With the increase of high-quality labeling images, the training efficiency of the recognition model is gradually improved, which can continuously optimize the accuracy of software recognition and classification.

(3) The present invention realizes full-view blood cell analysis by the computer, which ensures the comprehensiveness and accuracy of the samples, enhances the accuracy of model recognition, greatly reduces the interference of human objective factors and improves the objectivity and consistency of inspection results.

(4) The present invention generates the sample database based on the full-view images to avoid missing marginal incomplete cells at the single view. In addition, because the present invention can quickly and accurately locate and identify the blood cells, the accuracy and high efficiency of the analysis of all blood cells (thousands of blood cells to hundred thousand blood cells) in the full-view image can be ensured. At the same time, the blood cell recognition model is trained to improve the accuracy and comprehensiveness of the sample data and improve the accuracy of recognition and labeling.

(5) The image quality of the single-view image is evaluated, and the image with the clearest cell is selected as the final single-view image of the view to ensure the quality of the single-view image as the sample.

(6) The present invention only needs to input the single-view blood smear image to output the recognition results, realizing end-to-end design and convenient operation for users.

The above illustration is only an overview of the technical solution of the present invention. To understand the technical means of the present invention more clearly, the technical solution can be implemented in accordance with contents of the description, and to make above and other purposes, features and advantages of the present invention more apparent and legible, specific embodiments of the present invention are provided below.

DESCRIPTION OF DRAWINGS

One or more embodiments are described exemplarily through pictures in drawings corresponding thereto, the exemplary descriptions are not intended to limit the embodiments, elements having the same reference number labels in the drawings are expressed as similar elements, the diagrams in the drawings do not limit a proportion unless otherwise specified.

DETAILED DESCRIPTION

To make the purpose, the technical solution and the advantages of embodiments of the present invention more clearly, embodiments of the present invention will be described below in detail in combination with the drawings. However, those ordinary skilled in the art can understand that in various embodiments of the present invention, many technical details are proposed for the readers to better understand the present application. However, the technical solution claimed in the present application may be realized without these technical details and various changes and modifications based on the following embodiments. The division of the following embodiments is for the convenience of description, and shall not constitute any limitation to the specific implementation of the present invention. The embodiments can be combined and referenced with each other on the premise of no contradiction.

Figure 1:
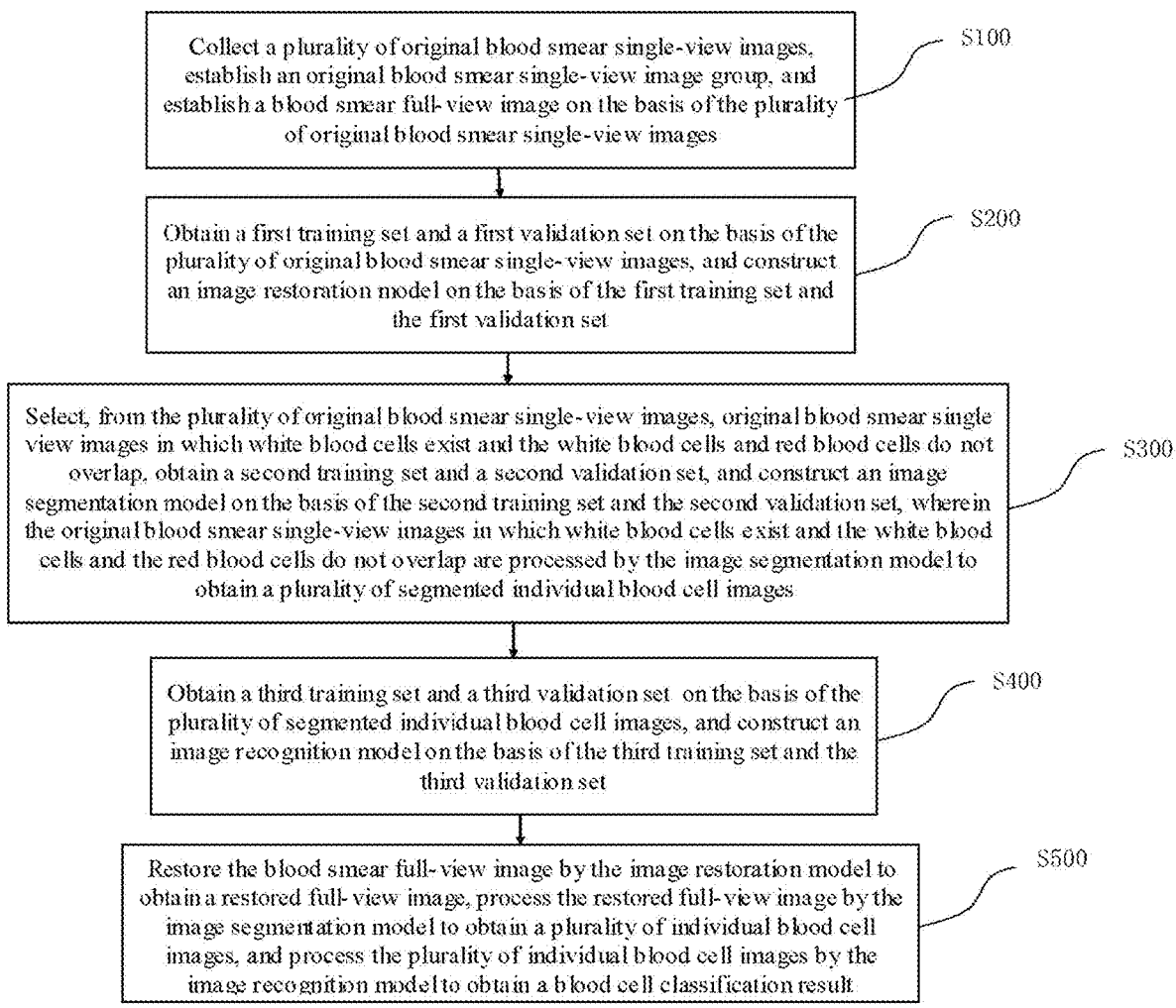
FIG. 1 is a flow chart of a blood smear full-view intelligent analysis method in the present invention.
Figure 2:
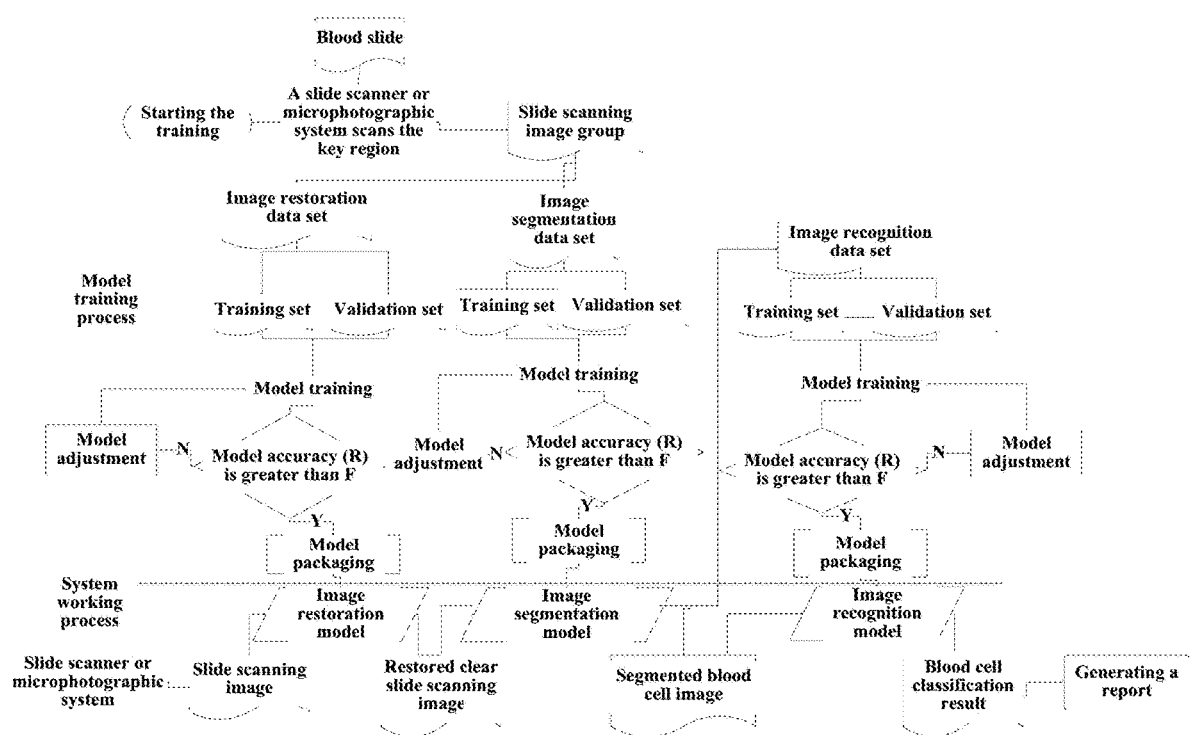
FIG. 2 is a schematic diagram of a blood smear full-view intelligent analysis method in the present invention.

The present invention provides a blood smear full-view intelligent analysis method, comprising the following steps, as shown in FIG. 1 and FIG. 2:

Step S100, a plurality of original blood smear single-view images are collected, an original blood smear single-view image group is established, and a blood smear full-view image is established based on the plurality of original blood smear single-view images.

Firstly, blood samples are collected and made into blood smears. A blood smear scanner based on automation technology or a microphotographic system based on manual adjustment is used to take full-view blood smear photos. In the full-view imaging process, one method is an image splicing method based on feature comparison, and the other method is a motion shooting method based on fuzzy self-adaptation.

The image splicing method based on feature comparison is to synthesize a plurality of single-view images into a full-view image. In this process, it is necessary to use feature comparison and pattern matching to identify mechanical errors and shooting errors, and to register and splice adjacent single-view images.

The motion shooting method based on fuzzy self-adaptation abandons the traditional photomicrography solution of focusing first and then taking photos, but takes photos repeatedly during the uniform motion in the focal length direction, and then synthesizes a plurality of shot single-view images into a clear full-view image by using a weighted synthesis algorithm based on motion compensation.

Step S200, a first training set and a first validation set are obtained based on the plurality of original blood smear single-view images, and an image restoration model is constructed based on the first training set and the first validation set.

Specifically, due to the mechanical motion jitter of the device and the differences in optical components, the quality of blood smear images taken by the blood smear scanner or the microphotographic system based on manual adjustment may deteriorate, and eventually the image may not match with reality. In order to effectively eliminate adverse effects brought by low-quality images, the image restoration model based on deep convolutional neural networks is constructed. The input of the model is a low-quality image (hereinafter referred to as a degraded image), and the output is a high-quality image after denoising, deblurring and sharpening. Firstly, a degradation model is established, training is conducted according to the degradation model to obtain specific degradation parameters, and then a restoration model is established by removing noise, etc., so as to restore the image.

Specifically, the establishment process of the restoration model is as follows:

A plurality of blood smear single-view images are divided into two sets A and B. The set A comprises all low-quality images (hereinafter referred to as degraded images) of the plurality of blood smear single-view images and the set B comprises all the high-definition images of a plurality of blood smear single-view images. The degraded images in the set A and the high-definition images in the set B are in a many-to-one relationship, that is, one high-definition image in the set B corresponds to a plurality of degraded images in the set A. After the set A and the set B are obtained, ⅟10 of the degraded images in the set A and ⅟10 of the high-definition images in the set B corresponding to the degraded images extracted from the set A are randomly selected as a first validation set; and the rest of the images are used as a first training set.

Specifically, mode 1: reconstruction is conducted with prior knowledge.

A degradation model is established, and image restoration is conducted based on the degradation model. The restoration model is established by removing noise, to restore the image.

If a degradation function is a linear time-invariant process, $g(x,y)=h(x,y)*f(x,y)+\eta(x,y)$. "*" in the formula indicates convolution; and the frequency domain is expressed as $G(u,v)=H(u,v)F(u,v)+N(u,v)$. The degradation function conducts estimation through observation, experience and modeling. The noise of a camera mainly comes from an image acquisition process and a transmission process, so the degradation function is constructed from the spatial domain and the frequency domain of the noise. Some important noise, such as Gaussian noise, Rayleigh noise and Gamma noise, are restored by a mean filter, an order-statistic filter, an adaptive filter, a band stop filter, a band pass filter, a notch filter, a notch band pass filter, an optimal notch filter, inverse filtering, wiener filtering, etc.

Specifically, mode 2: super-resolution images are reconstructed by a first convolutional neural network.

An image restoration model based on the first convolutional neural network is constructed based on the first training set and the first validation set, and image reconstruction is performed based on the image restoration model to obtain a reconstructed blood smear full-view image.

A learning mode is composed of forward propagation and backward error propagation. The degraded image firstly enters an input layer, then enters a middle hidden layer through the input layer, and enters an output layer. If the output layer cannot match with the expectation, backward propagation is conducted according to a difference between the output layer and the expectation. In this process, the weights of the hidden layer are adjusted to make the feedback error smaller. The above process is iterated repeatedly until the difference between the output layer and the expectation is less than the set threshold, and the final image restoration model is generated.

The finished model is packaged and deployed.

Step S300, the original blood smear single-view images in which white blood cells exist and the white blood cells and red blood cells do not overlap are selected from the plurality of original blood smear single-view images to obtain a second training set and a second validation set, an image segmentation model is constructed based on the second training set and the second validation set, and the plurality of original blood smear single-view images in which white blood cells exist and the white blood cells and red blood cells do not overlap are processed by the image segmentation model to obtain a plurality of segmented single blood cell images.

The input of the image segmentation model is a single-view image of an entire blood smear, and the output is an image of a single blood cell.

Figure 3:
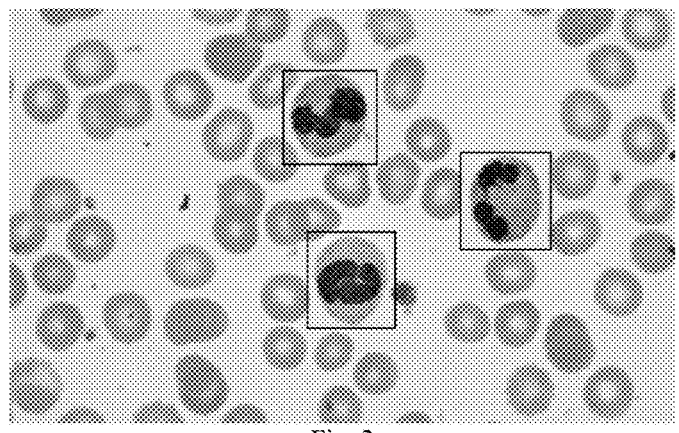
FIG. 3 is a schematic diagram of blood cell labeling in an image segmentation method of the present invention.

Specifically, the blood smear single-view images in which white blood cells exist and the white blood cells and red blood cells do not overlap are selected; and the positions and contours of the white blood cells and the red blood cells in the image are labeled (as shown in FIG. 3, which is a single-view image of the entire blood smear. The box part is a small image of blood cells). When the amount of labeling reaches the training requirement (5000-15000), 1/10 of the labeled images are randomly selected as the second validation set, and the rest images are used as the second training set.

The image segmentation model is constructed based on the second validation set and the second training set.

The second convolutional neural network comprises a plurality of convolutional blocks; each convolutional block comprises a plurality of convolutional layers, 1 pooling layer, 1 activation layer, and 1 fully connected layer; and each convolutional layer comprises a plurality of convolutional kernels.

Specifically, the operation comprises the following steps:

Step S310, certain original blood smear single-view image data in the second training set is outputted into a convolutional block of a second convolutional neural network by an input layer of the second convolutional neural network;

Step S320, the number of convolutional blocks of an encoding structure of the second convolutional neural network, the number of convolutional layers of each convolutional block, the number of pooling layers of each convolutional block, the number and size of convolutional kernels of each convolutional layer, and the number and size of the convolutional kernels of each pooling layer are set, and first key features are extracted.

Specifically, the size of the convolutional kernel in each convolutional layer of the encoding structure of the second convolutional neural network is the same, and the number of the convolutional kernels of each convolutional layer of a next convolutional block is twice the number of the convolutional kernels of each convolutional layer of a previous convolutional block; the number of the pooling layers of each convolutional block is the same, and the number and size of the convolutional kernels of each pooling layer are the same.

Specifically, the number of the convolutional blocks of the second convolutional neural network is set to 5, the number of the convolutional layers of each convolutional block is set to 3, and the size of each convolutional kernel of each convolutional layer is set to 3. The number of the convolutional kernels in each convolutional layer of the first convolutional block is set to 60, the number of the convolutional kernels in each convolutional layer of the second convolutional block is set to 120, the number of the convolutional kernels in each convolutional layer of the third convolutional block is set to 240, the number of the convolutional kernels in each convolutional layer of the fourth convolutional block is set to 480, and the number of the convolutional kernels in each convolutional layer of the fifth convolutional block is set to 960; and the number of the pooling layers for each convolutional block is set to 1, and the size of the convolutional kernels for each pooling layer is set to 2.

Step S330, the same number of decoding structure convolutional blocks as the number of encoding structure convolutional blocks is set; the number and size of the convolutional kernels of the convolutional layer of each convolutional block of a decoding structure, the number of pooling layers of each convolutional block and the number of convolutional kernels of each pooling layer are consistent with the corresponding convolutional blocks in the encoding structure; and the decoded data are obtained based on the first key features.

Step S340, final convolution computation is performed on the decoded data, the size of the convolutional kernels of the final convolution computation is 1, and the number of the convolutional kernels is set as the number of types to be segmented.

Step S350, the decoded data subjected to the convolution computation is fully connected with a plurality of neurons in the output layer of the second convolutional neural network by a fully connected layer of each convolutional block of the second convolutional neural network; and a predicted segmentation result is outputted by the output layer of the second convolutional neural network;

Step S360, steps S310 to S350 are repeated, and an image segmentation model is obtained through iterative parameter adjustment.

The finished model is packaged and deployed.

Figure 4:
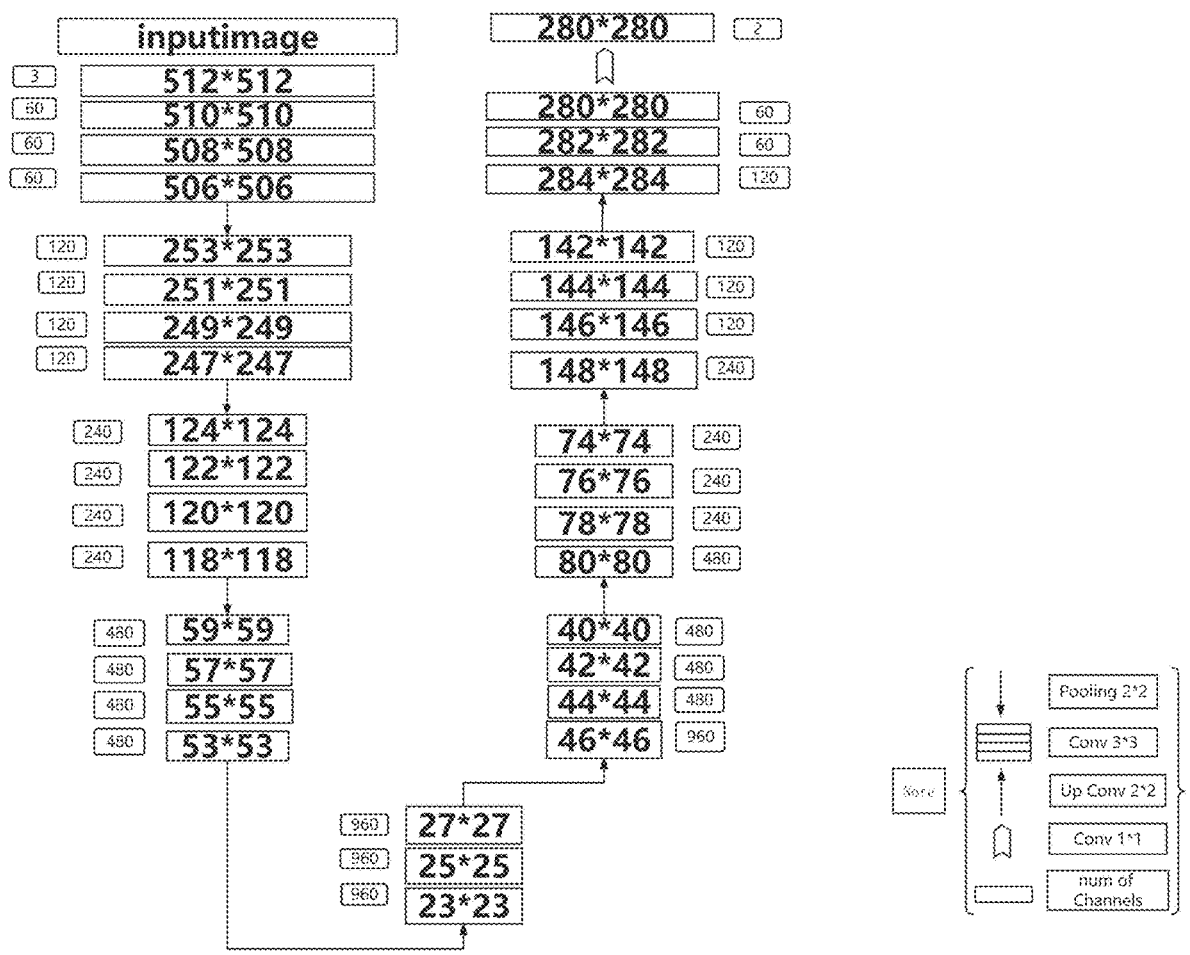
FIG. 4 is a schematic diagram of an image segmentation model of the present invention.

Specifically, optionally, as shown in FIG. 4, the size of the blood smear single-view image of the input layer is 512×512 pixels, the encoding structure of the second convolutional neural network has a total of 5 convolutional blocks, and the number of the pooling layers of each convolutional block is 1. Each convolutional block has 3 convolutional layers, and the size of each convolutional kernel in each convolutional layer is 3. The number of the convolutional kernels of each convolutional layer in the first convolutional block is 60. Three convolution computations with a convolutional kernel size of 3 are conducted to fully extract the shallow feature A, and then a max pooling computation with a convolutional kernel size of 2 is conducted to extract the key feature A'; then, the number of the convolutional kernels of each convolutional layer in the second convolutional block is set to 120, three convolution computations with a convolutional kernel size of 3 are conducted to fully extract the shallow feature B, and then the max pooling computation with a convolutional kernel size of 2 is conducted to extract the key feature B'; then, the number of the convolutional kernels of each convolutional layer in the third convolutional block is set to 240, three convolution computations with a convolutional kernel size of 3 are conducted to fully extract the shallow feature C, and then the max pooling computation with a convolutional kernel size of 2 is conducted to extract the key feature C'; then, the number of the convolutional kernels of each convolutional layer in the fourth convolutional block is set to 480, three convolution computations with a convolutional kernel size of 3 are conducted to fully extract the shallow feature D, and then the max pooling computation with a convolutional kernel size of 2 is conducted to extract the key feature D'; then, the number of the convolutional kernels of each convolutional layer in the fifth convolutional block is set to 960, three convolution computations with a convolutional kernel size of 3 are conducted to fully extract the shallow feature E, and then the max pooling computation with a convolutional kernel size of 2 is conducted to extract the final key features.

Subsequently, the decoding computation is conducted. The decoding structure has 5 convolutional blocks. The first convolutional block of the decoding structure is the fifth convolutional block of the encoding structure; the number of the convolutional layers of each convolutional block of the decoding structure is 2; and the number of the pooling layers in each convolutional block is 1. The size of each convolutional kernel in each convolutional layer is 3. Firstly, an up-convolution computation with a convolutional kernel size of 2 is conducted based on the above final key features for up-sampling to obtain feature a, then the number of the convolutional kernels for each convolutional layer of the second convolutional block is set to 480, and two convolution computations with a convolutional kernel size of 3 are conducted to obtain feature a'; the up-convolution computation with a convolutional kernel size of 2 is conducted again for upsampling to obtain feature b, and then the number of the convolutional kernels for each convolutional layer of the third convolutional block is set to 240; two convolution computations with a convolutional kernel size of 3 are conducted to obtain feature b'; the up-convolution computation with a convolutional kernel size of 2 is conducted again for upsampling to obtain feature c, and then the number of the convolutional kernels for the fourth convolutional block is set to 120; two convolution computations with a convolutional kernel size of 3 are conducted to obtain feature c'; the up-convolution computation with a convolutional kernel size of 2 is conducted again for upsampling to obtain feature d, and then the number of the convolutional kernels for the fifth convolutional block is set to 60; two convolution computations with a convolutional kernel size of 3 are conducted to obtain feature d'; and finally, 1*1 convolution computation is conducted, and the number of the convolutional kernels is set to the number of types to be segmented, to obtain a segmentation result.

The above steps are repeated. The image segmentation model is trained using the second training set, and the finished image segmentation model is obtained through iterative parameter adjustment. After that, the finished model is packaged and deployed.

Step S400, a third training set and a third validation set are obtained based on the plurality of segmented single blood cell images, and an image recognition model is constructed based on the third training set and the third validation set.

The input of the image recognition model is a segmented single blood cell image, and the output is a probability value of the cell belonging to certain types.

Specifically, the original single-view blood smear image is segmented into images of white blood cells, red blood cells and platelets through the image segmentation model. The images of white blood cells, red blood cells and platelets are labeled, to label the types to which the cells belong. After the amount of labeling meets the training requirements (the number of the images in each type is greater than 10000), 1/10 of the images are randomly selected as the third validation set, and the rest of the images are used as the third training set.

Specifically, construction of the image recognition model comprises the following steps:

Step S410, a certain segmented single blood cell image data in the third training set is outputted into a convolutional block of the third convolutional neural network by an input layer of the third convolutional neural network.

Step S420, the number of convolutional blocks of the third convolutional neural network, the number of convolutional layers of each convolutional block, the number of pooling layers of each convolutional block, the number and size of convolutional kernels of each convolutional layer, and the number and size of the convolutional kernels of each pooling layer are set, and second key features are extracted.

Specifically, the convolutional neural network can be configured to comprise a plurality of convolutional blocks; each convolutional block comprises a plurality of convolutional layers, 1 pooling layer, 1 activation layer, and 1 fully connected layer; and each convolutional layer comprises a plurality of convolutional kernels.

Step S430, the second key features are fully connected with a plurality of neurons in the output layer of the third convolutional neural network by a fully connected layer of the third convolutional neural network; and a predicted recognition result is outputted by the output layer of the third convolutional neural network.

Step S440, steps S410 to S430 are repeated, the third training set is used for training, and a finished image recognition model is obtained through iterative parameter adjustment.

The finished model is packaged and deployed.

Figure 5:
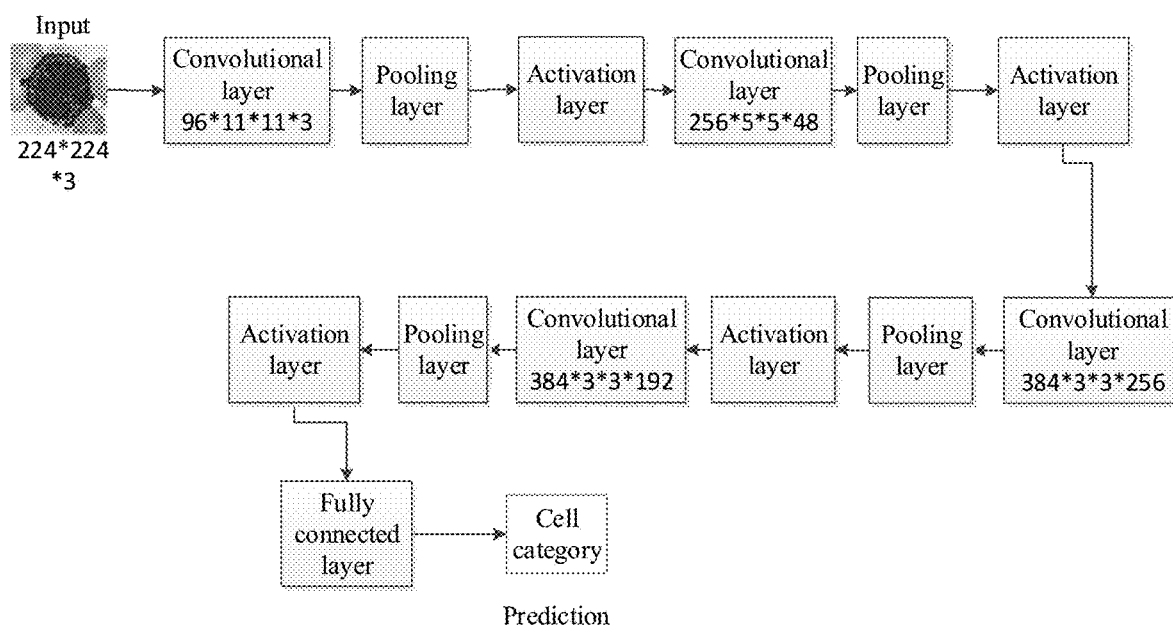
FIG. 5 is a schematic diagram of an image recognition model of the present invention.

Specifically, as shown in FIG. 5, the size of the input image is 224*224*3, the image size has 224*224 pixels, and 3 is an RGB image. The third convolutional neural network has four convolutional blocks, and each convolutional block contains a plurality of convolutional layers, a pooling layer and an activation layer. The first convolutional block contains 96 convolutional layers, the size of the convolutional kernels of each convolutional layer is 11*11*3 and the number of the convolutional kernels of each convolutional layer is 27*27*96; the second convolutional block contains 256 convolutional layers, the size of the convolutional kernels of each convolutional layer is 5*5*48 and the number of the convolutional kernels of each convolutional layer is 27*27*128; the third convolutional block contains 384 convolutional layers, the size of the convolutional kernels of each convolutional layer is 3*3*256, and the number of the convolution kernels of each convolutional layer is 13*13*192; the fourth convolutional block contains 384 convolutional layers, the size of the convolutional kernels of each convolutional layer is 3*3*192, and the number of the convolutional kernels of each convolutional layer is 13*13*256. The fully connected layer fully connects the output of the fourth convolutional block with 100 neurons in the final output layer, and outputs the predicted recognition result.

The third training set is used to train the image recognition model, and the finished image recognition model is obtained through iterative parameter adjustment. After that, the finished image recognition model is packaged and deployed.

Step S500, the blood smear full-view image is restored by an image restoration model to obtain a restored full-view image, the restored full-view image is processed by the image segmentation model to obtain a plurality of single blood cell images, and the plurality of single blood cell images are processed by the image recognition model to obtain a blood cell classification result.

Specifically, in the process of system application, the blood smear to be detected also needs the full-view photography through the blood smear scanner or the microphotographic system to establish a blood smear scanning image. After processed by the image restoration model, a clear restored blood smear scanning image is obtained and then processed by the image segmentation model to obtain a single blood cell image. Finally, the blood cell image is recognized to obtain a cell classification result and output a report.

Figure 6:
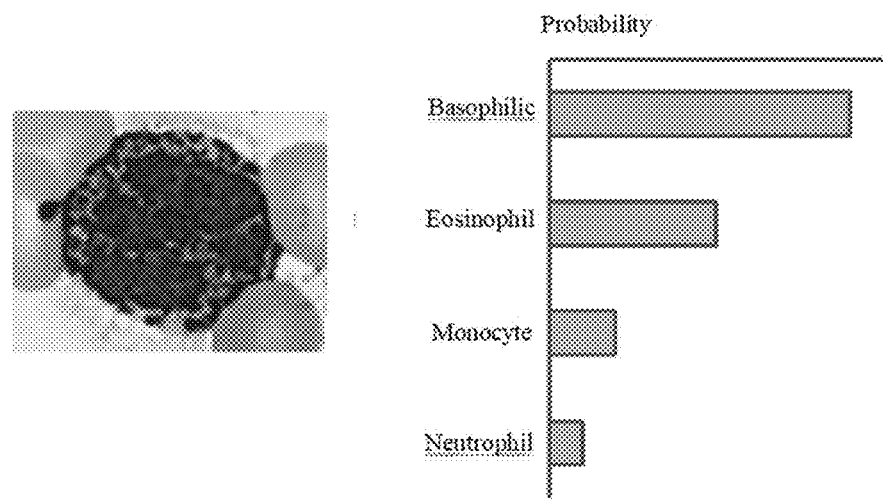
FIG. 6 is a diagram of image recognition results of the present invention.
Figure 7:
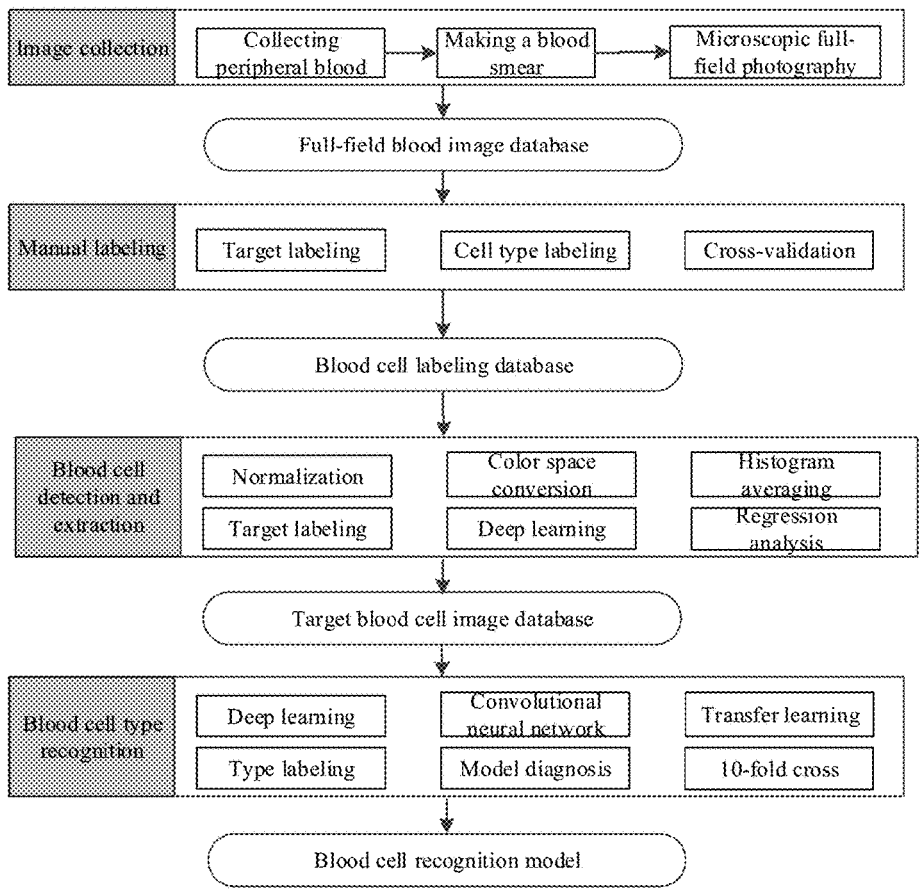
FIG. 7 is a flow chart of construction of a blood cell recognition model based on deep learning in the present invention.

Specifically, FIG. 6 shows the image recognition result.

The overall time is shortened by more than two-thirds. The accuracy of a prototype system on a test set of 200,000 white blood cell images is higher than 95%, and a false negative rate is lower than 1.6%.

In conclusion, the present invention provides a blood smear full-view intelligent analysis method, comprising: collecting a plurality of original blood smear single-view images, establishing an original blood smear single-view image group, and establishing a blood smear full-view image based on the plurality of original blood smear single-view images; constructing an image restoration model based on the first training set and the first validation set; constructing an image segmentation model based on the second training set and the second validation set; obtaining the third training set and the third validation set based on the plurality of segmented single blood cell images; constructing an image recognition model; and finally obtaining a blood cell classification result. In the present invention, the blood cells are analyzed in the full view on the basis of artificial intelligence algorithms, thereby greatly reducing the interference of human factors and enhancing the objectivity of inspection results, with high accuracy of blood cell analysis and classification. For satisfactory image input, recognition and analysis can be realized; robustness and accuracy of the algorithms are higher than those of the traditional image recognition algorithms; the existing medical inspection process is overturned; and the entire time is greatly shortened.

The acquisition of electronic data of full slides is the basis for the realization of comprehensive and objective detection. The current medical inspection field, especially the routine blood test, has arduous tasks and heavy workload. A considerable number of hospitals introduce more advanced auxiliary inspection systems, but cannot solve the problem of full slide inspection and often cause one-sided results and high manual re-inspection rates. In addition, high-level inspection physician talents are seriously insufficient and unevenly distributed, resulting in inconsistent judgment results of abnormal cell morphology in peripheral blood. The current main recognition and classification algorithms belong to the traditional sequence. In the actual operation process, the accuracy of recognition is not high and extremely easy to be interfered by subjective experience and human factors.

Existing blood cell recognition mainly has two technical problems: (1) the full-view scanning analysis of the blood smears is not possible, resulting in one-sided and inaccurate results; (2) due to defects in the recognition and classification algorithms, manual re-inspection is required, making it extremely easy to be interfered by subjective experience and human factors, so that the accuracy of recognition is low.

Figure 13:
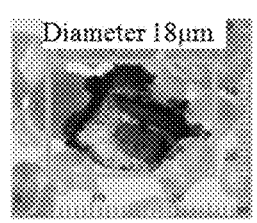
FIG. 13 is a schematic diagram of recognition results of an embodiment of FIG. 12.
Figure 13:
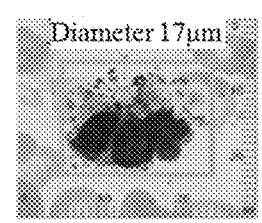

To solve the above technical problems, in conjunction with FIG. 13, embodiments of the present invention provide a blood cell recognition model construction method to obtain a blood cell segmentation model and recognition model for blood cell recognition. The specific steps are as follows:

(1) Image Collection

The peripheral blood is collected, and blood smears are made. The collected blood samples are digitized, and a blood image database is established. The full slide full-view images of the blood smears are stored in the database.

Figure 11A:
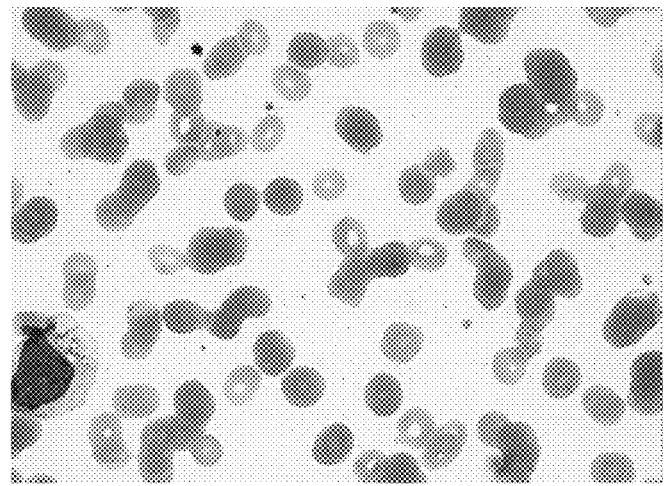
FIG. 11A is a schematic diagram of a first single-view image.
Figure 11B:
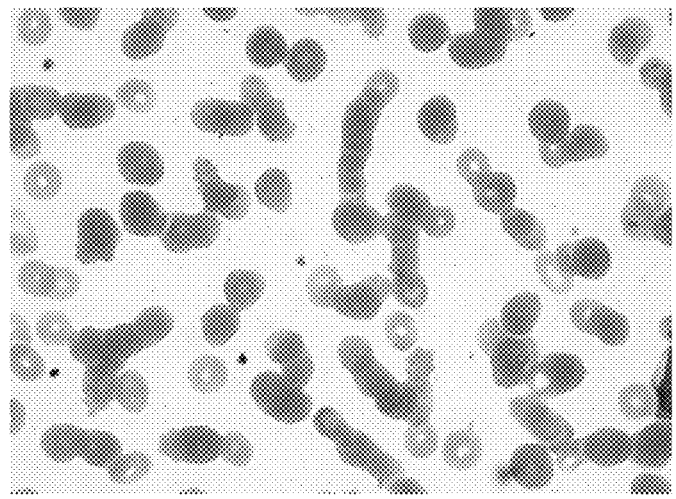
FIG. 11B is a schematic diagram of a second single-view image.
Figure 11C:
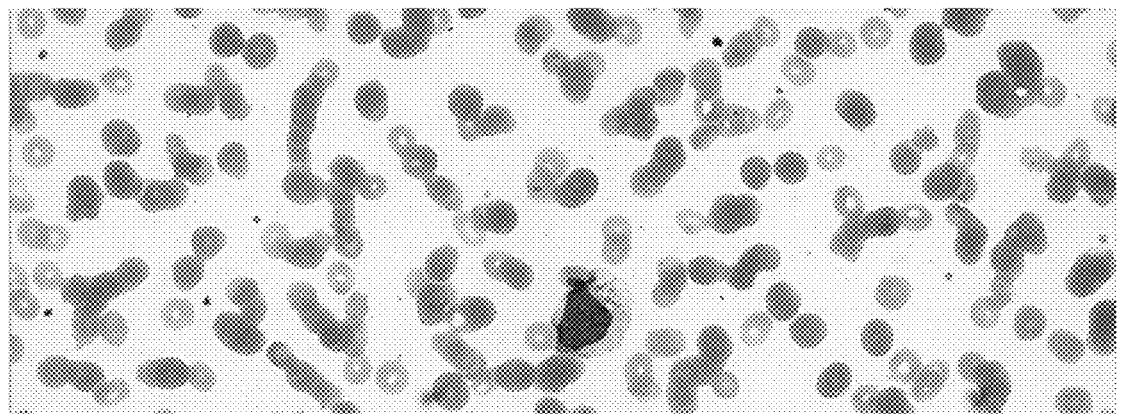
FIG. 11C is a schematic diagram of an image after splicing of the first single-view image and the second single-view image.

Because the camera has a limited shooting range under a high-power microscope, especially a 100-fold objective lens, single-view images with a physical size of about 150*100 μm (micrometers) can only be shot, as shown in FIGS. 11A and B. The blood cells at the edges of the single-view images cannot be accurately recognized. In order to exhaustively acquire the image of the whole blood slide cell (with size of 15 mm*25 mm about), it is necessary to splice about 25,000 single-view images into a full-view image. As shown in FIG. 11C, the blood cells at the edge are spliced to form a complete blood cell image. Compared with the single-view image, the full-view image can exhaustively extract incomplete cells at the edge of a single view. Common algorithms for splicing include, but not limited to, FAST algorithm, SURF algorithm and image registration.

The acquisition method of the full-view image comprises: firstly smearing the collected blood sample to obtain a blood slide, and then using high-precision photomicrography and mechanical control technology to take a full-view blood photo. An imaging system firstly focuses the full slide at a fixed point, and then continuously moves along the same distance from a corner of the slide to take all the sub-view photos which are finally spliced to form a full-view image. Image preprocessing and manual image segmentation are conducted on the blood smear image to obtain single blood cell images which are assembled to form an original blood cell image database as a training sample of the blood cell segmentation model.

Splicing modes comprise, but not limited to, mode 1, extracting feature points of single-view images that are physically adjacent in pairs, with feature factors that include but not limited to sift, surf, harris corner and ORB, and then matching image features to finally form a complete full-view image; mode 2, judging the size of the overlapped regions of two adjacent single-view images, then performing weighted average on the overlapped parts to obtain the image of the overlapped parts, and finally obtaining the full-view image.

(2) Manual Labeling

The original blood cell image is labeled to form a labeled blood cell image database as a training sample set of the blood cell recognition model. The labeling of blood cell types needs to be completed by experienced doctors of blood test laboratory, and cross-validation can be selectively conducted on labeling results.

In order to facilitate the labeling work of professional doctors and related labelers, an expert labeling system for labeling two classes of cells of white blood cells and red blood cells based on three platforms can be optionally equipped. The three platforms include iOS, Android and PC. In one embodiment, the portability of a mobile device is fully utilized; the corresponding APP is developed to distribute the data to the mobile device of the labeler; and data such as definition and category can be labeled for different image types at any time.

(3) Construction and Training of Blood Cell Segmentation Model and Recognition Model The training samples are randomly selected to form training set and validation set, and the blood cell segmentation model and recognition model are trained. In one embodiment, a 10-fold cross-validation method is adopted to divide the data set into ten parts, and nine parts are used as training data and one part is used as test data in turn for training and optimizing the models.

Figure 8:
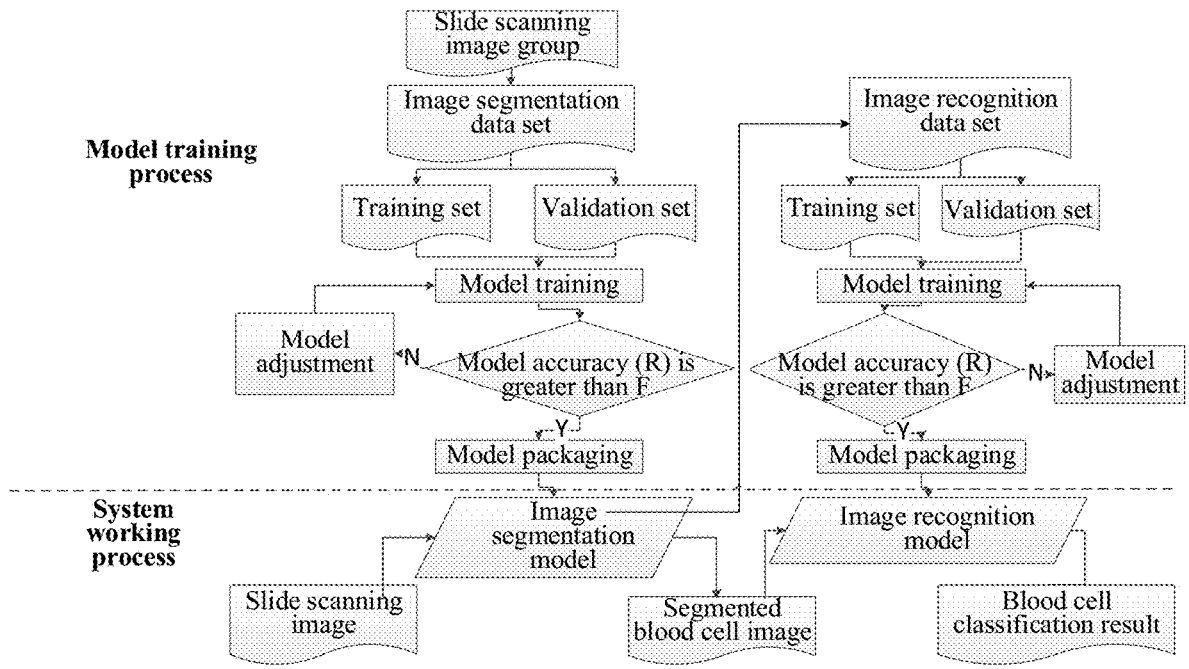
FIG. 8 is a flow chart of blood cell segmentation, recognition model training and work in an embodiment.

In conjunction with FIG. 8, the training set and the validation set are selected from the original blood cell image database to train the blood cell segmentation model. If the accuracy (R) of the position and image of a single blood cell obtained by the blood cell segmentation model is greater than a set threshold F1, the model training is completed and the model is packaged; otherwise, if the accuracy (R) is not greater than the set threshold F1, the gradient is reversely transmitted to increase the accuracy (R), and the blood cell segmentation model is adjusted. The original blood cell image database is constructed based on the full-view image, so the segmentation accuracy of the blood cell segmentation model is higher.

The target blood cells are detected and extracted from the single-view image of a target, thereby generating the single blood cell image database of the target and preparing necessary conditions for the recognition of the single blood cell. The main techniques used are divided into two categories. One category comprises the traditional image pattern recognition modes, such as normalization, color space conversion and histogram averaging. The other category comprises methods based on deep learning, such as YOLO, SSD and DenseBox.

The two categories of recognition modes can be used to model the blood cell segmentation model of the present invention. Since the blood cell image has a relatively single category composition compared with the natural image, in one embodiment, a deep learning mode is used to model the blood cell segmentation model.

The training set and the validation set are selected from the labeled blood cell image database to train the blood cell recognition model. If the accuracy (R) of the blood cell recognition model is greater than a set threshold F2, the model training is completed and the model is packaged; otherwise, if the accuracy (R) is not greater than the set threshold F2, the gradient is reversely transmitted to increase the accuracy (R), and the blood cell recognition model is adjusted.

Optionally, according to the characteristics of the blood cells, the blood cell recognition model adopts feedforward neural networks that include convolution computation and have deep structure to train the feedforward neural network model, thereby implicitly performing the training from the training data to extract the features, and optimizing the model through continuous parameter optimization and error analysis, to finally form a mature blood cell recognition model. When the accuracy (R) is not greater than the set threshold, the accuracy (R) of the blood cell recognition model is transmitted backward, and the weight of each convolutional layer is adjusted.

The type of the detected single blood cell image is determined. In order to improve the recognition rate of the blood cells and reduce the requirements for the quality of the original image and the limitation on the number of training samples, in one embodiment, the feedforward neural networks with deep structure based on transfer learning are used to construct the blood cell recognition model. Training is conducted based on the ImageNet data set to obtain the original image recognition model. Then, a blood cell image labeling database is used for migration learning, and a test model is obtained after adjusting the parameters. By changing the convolutional kernels and the neural network layers, higher calculation speed and more accurate type judgment can be achieved.

Figure 9:
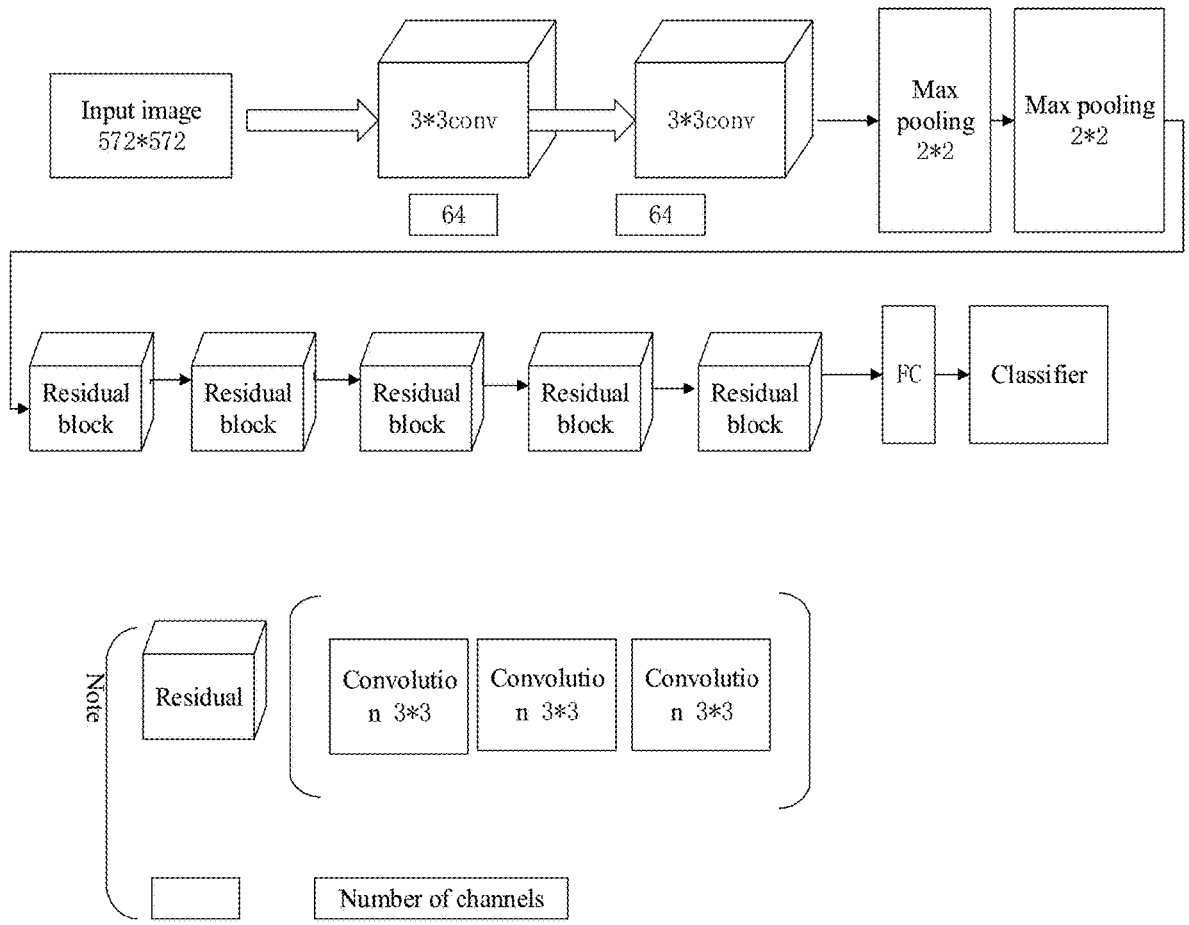
FIG. 9 shows a blood cell recognition model in an embodiment.

As a preferred embodiment of the feedforward neural network, in conjunction with FIG. 9, the network uses the convolutional neural network to extract image features to achieve the purpose of image classification.

The input of the network is a single blood cell image of 572*572, followed by convolution computation with kernel size=3 and channel=64 to extract the feature vectors of various types of cells. Then, max pooling computation with size=2 is conducted to extract the most important features of the extracted features, such as edge, texture and color features, and the convolution computation is continued.

Figure 10:
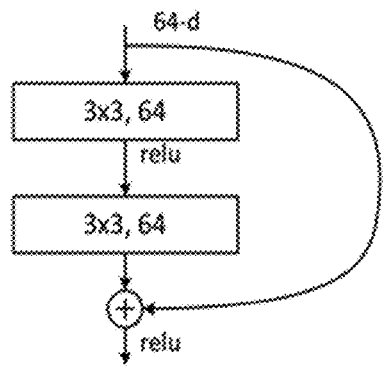
FIG. 10 is a detailed structural diagram in an embodiment of a residual block.

After the third layer, the residual block (Res.block) is connected and residual learning is conducted. Residual learning can effectively alleviate the disappearance and network degradation during reverse gradient propagation, so the network can be extended to the deep layer. Thus, the network is stronger and more robust. There are five layers of residual blocks. In the residual blocks, because identity mapping is to be maintained, the output size and the number of channels are adjusted by conv 1*1. Then, two fully connected layers (FC) are connected behind the residual blocks for network classification, The number of neurons in the first fully connected layer is 4096. The 4096 features are transmitted to the next layer of neurons, and the classification network (classes) is used to classify the images. The number of neurons in the last layer is the number of target categories. Compared with natural images, the blood cell images have a relatively single category composition. Therefore, pruning based on the traditional algorithms, and changes in the convolutional kernels and the neural network layers can achieve higher computation speed and more accurate category judgment. A detailed structure of the residual block is shown in FIG. 10. An identity mapping from input to output is added. The residual block (Res-Block) can solve the problem of gradient disappearance while deepening the network (to extract more advanced features). The residual module can be activated from a certain layer, and then fed back to another layer or even a deeper layer. The residual network can be constructed by skip connection to train the deeper layer. In the curve part in FIG. 10, the network structure directly skips two 3×3,64 network layers, and transfers the features to the deeper layer. That is, the input x is convolved with 3*3, activated by the Relu activation function, and then superimposed with the input x after the 3*3 convolution, and then output after activated by the Relu activation function.

The blood cell recognition model comprises, but not limited to the convolutional neural network, and can also be realized on the basis of the traditional recognition algorithms or reinforcement learning ideas.

For slide imaging, a specific region that is ideal for imaging exists, which can provide high-quality image data. Some important parts, such as the head, middle, and tail of the slide, are the key distribution regions of the blood cells, and have great influence on the recognition results. In practice, doctors may be interested in some regions and possibly designate some regions. The present invention proposes the concept of full-view blood cell analysis for the first time. The full-view range comprises slide specific regions, designated regions and important parts of the slide (head, middle and tail), as well as the full slide range. Determination of the view range can be further increased at first before image segmentation.

As an optional solution, manual assessment can be used in the application process to assess the segmentation of the blood cell segmentation model and recognition model, and the recognition results respectively, and transmit the gradient reversely according to the assessment results to optimize the blood cell segmentation model and recognition model.

As an optional solution, the blood cell segmentation model and recognition model of the present invention can be integrated and loaded in the same intelligent single unit equipment, for example, a computer is used to load the two models. The two models can also be loaded into different intelligent single unit equipment respectively according to actual needs.

Figure 12:
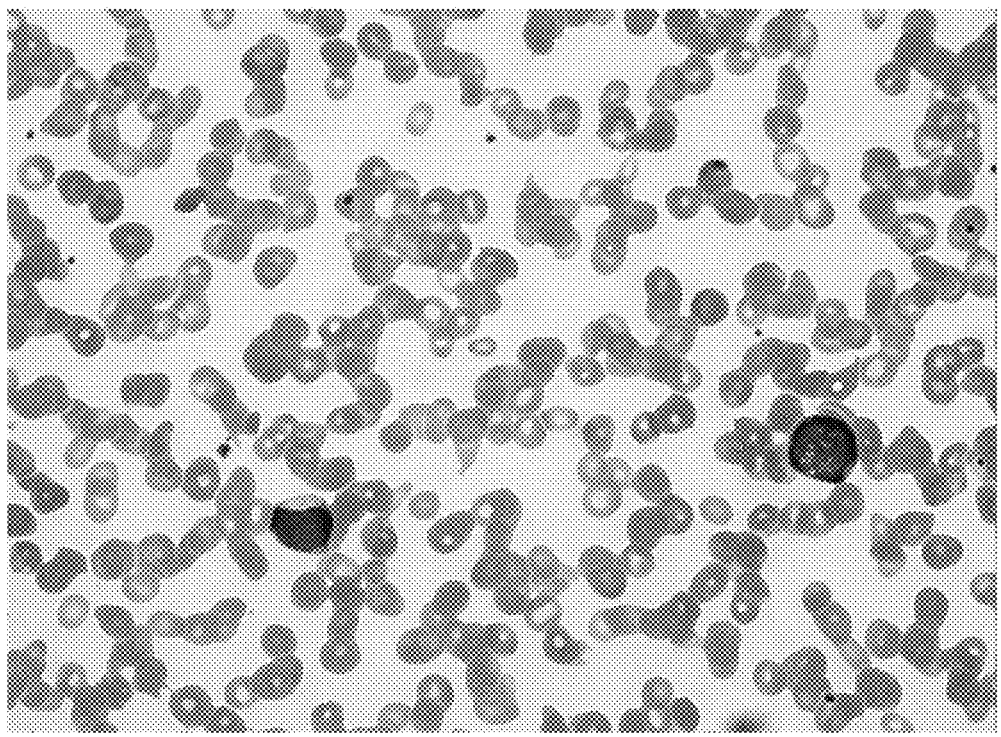
FIG. 12 is a recognition diagram of a blood cell recognition model of a single-view blood smear in an embodiment.

In conjunction with FIG. 8, in the actual application process, the blood cell segmentation model is first used to segment the scanned image based on a single view slide to obtain a single blood cell image and the corresponding position after the target segmentation. The blood cell recognition model is used to identify the cell categories to obtain the positions and categories of the blood cells. The recognition results are shown in FIG. 13. The position and category information is used to label the scanned image of the single view slide to obtain the recognition diagram of the blood cell recognition model of the single-view blood smear as shown in FIG. 12.

The blood cell recognition model of the present invention can realize the labeling of 50 kinds of white blood cells and more than 20 kinds of red blood cells, and is trained according to actual needs, with good extensibility.

The present invention realizes the recognition of the blood cells based on the artificial intelligence algorithm. Compared with the traditional recognition method, the accuracy is qualitatively improved, and the accuracy can reach more than 85%; and the full-view blood cells can be analyzed, which greatly improves the scientificity.

The present invention generates the blood image database based on the full-view images and trains the blood cell segmentation model, thereby ensuring the accuracy and comprehensiveness of data and improving the segmentation accuracy of the blood cell segmentation model. The present invention realizes full-view blood cell analysis by the computer, which greatly reduces the interference of the human objective factors and improves the objectivity and consistency of the inspection results. The blood cell segmentation model and recognition model have intelligence. Software algorithms have self-learning properties. With the increase of high-quality labeling images, the training efficiency of the recognition model is gradually improved, which can continuously optimize the accuracy of software recognition and classification.

At present, the blood test process in the hospital is: blood samples-blood analyzer-pushing and staining machine-manual microscopy. The whole process takes 60 minutes. Blood is drawn manually to obtain a blood sample; various blood cell counts, white blood cell classification, and hemoglobin content are obtained through a blood analyzer; staining and labeling are conducted with the pushing and staining machine to a slide for manual microscopy; and after manual microscopy, the final morphological analysis results of blood cells are obtained, such as abnormal blood cell recognition, and the like.

The technologies of the existing blood analyzers are mainly realized based on three types: electrical impedance, laser measurement and comprehensive methods (flow cytometry, cytochemical staining, special cytoplasmic division and the like).

The prior art has the problems that: firstly, the analysis and counting of the blood cells within the full view of the blood smear are not realized, and the number of data samples is not enough, causing that the results are one-sided and not accurate; secondly, the counting and classification algorithms are traditional, the effect of morphological analysis is poor, and the recognition accuracy is not high; and thirdly, high-level inspection physician talents are seriously insufficient, and manual microscopic examination doctors are insufficient.

Figure 14:
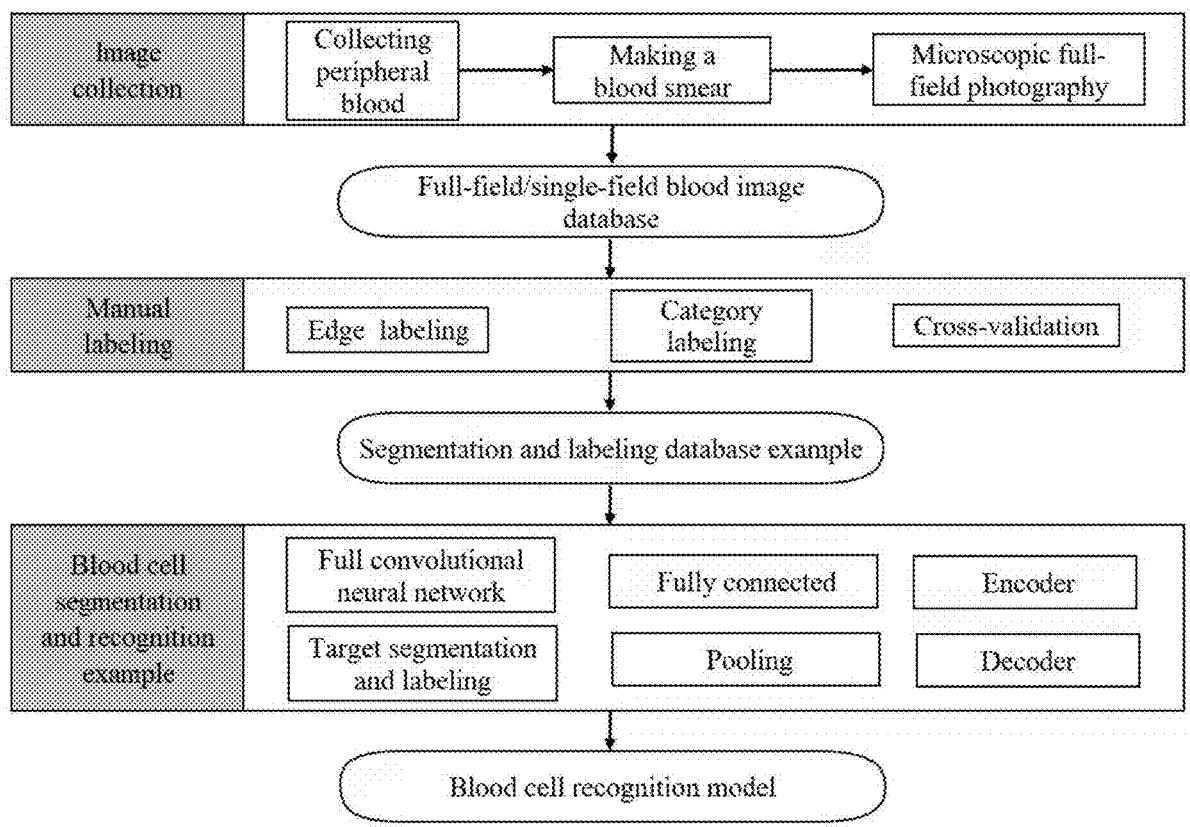
FIG. 14 is a flow chart of construction of a blood cell recognition model.

Based on the above technical problems, in conjunction with FIG. 14 which shows the structure of the blood cell recognition model, the blood smear is first taken at full view under the microscope to establish a slide scanning image group; then, the original blood cell images are manually labeled by a labeling team formed by professional doctors and ordinary labelers, and the images are randomly selected to establish the training set and the validation set; and finally, the artificial intelligence technology is used for training the model, and the model is optimized through continuous parameter optimization and error analysis, to finally form a mature image example recognition model. Model input is a single-view blood smear image, and outputs are all target cell positions, edges and types on the image.

(1) Image Collection

A stained and smeared blood smear is put under the microscope; after the camera is connected, high-speed continuous photographing is conducted at the same view while adjusting the focus; then, the quality of a plurality of images at this view is evaluated; the image with the clearest cells is selected as the final single-view image of this view; and the image clarity evaluation algorithms include, but not limited to PSNR (Peak Signal to Noise Ratio), SSIM (Structural Similarity Index), etc.

Because the camera has a limited shooting range under a high-power microscope, especially a 100-fold objective lens, single-view images with a physical size of about 150*100 μm can only be shot. The blood cells at the edges of the single-view images cannot be accurately recognized. In order to exhaustively acquire the image of the whole blood slide cell, it is necessary to splice about 25,000 single-view images into a full-view image. The blood cells at the edge of the single-view image are spliced to form a complete blood cell image. Compared with the single-view image, the full-view image can exhaustively extract incomplete cells at the edge of a single view. Common algorithms for splicing include, but not limited to, FAST algorithm, SURF algorithm and image registration.

The collected blood samples are digitized, and a blood image database is established. The full slide full-view images of the blood smears or the single-view images with the best image quality after image quality evaluation are stored in the database.

(2) Manual Labeling

The segmentation data labeling example is divided into blood cell edge labeling and category labeling, which can be completed by ordinary labelers and experienced doctors of blood test laboratory, and cross-validation is conducted on the labeling results. At least two labelers participate in the cross-validation process. The specific process is to distribute the same batch of data to different labelers. If the labeling results are the same, the labeling is considered valid. Otherwise, if the labeling is invalid, the image is deleted or re-labeled.

The labeling of blood cell edges is assisted by professional labeling software. The labelers collect the cell edge information of the full-view blood images or single-view images in the blood image database, and generate a corresponding json file for each image. This file contains the information of a single blood cell, such as profile, area and position.

In the category labeling part, in order to facilitate the labeling work of professional doctors and related labelers, an expert labeling system for labeling two classes of cells of white blood cells and red blood cells based on three platforms can be optionally equipped. The three platforms include iOS, Android and PC. In one embodiment, the portability of a mobile device is fully utilized; the corresponding APP is developed to distribute the data to the mobile device of the labeler; and categories of the blood cells can be labeled for different image types at any time by users.

After edge labeling, category labeling and cross-validation are completed, single-view or full-view blood images with valid labeling results are aggregated to form a labeling database example as a training sample set.

(3) Construction and Training of Blood Cell Recognition Model

The blood cell recognition model is realized by the artificial intelligence algorithms which comprise, but not limited to the convolutional neural network, and can also be realized by other fully-supervised, semi-supervised or unsupervised artificial intelligence algorithm. The rapid recognition of the single-view blood smear images is realized.

Full-view blood images or single-view images are randomly selected from the sample set to form a training set and a validation set. The data set is evenly divided into ten parts according to the requirements of 10-fold cross-validation. Nine parts are used as training data and one part is used as test data in turn for training and optimization.

Figure 15:
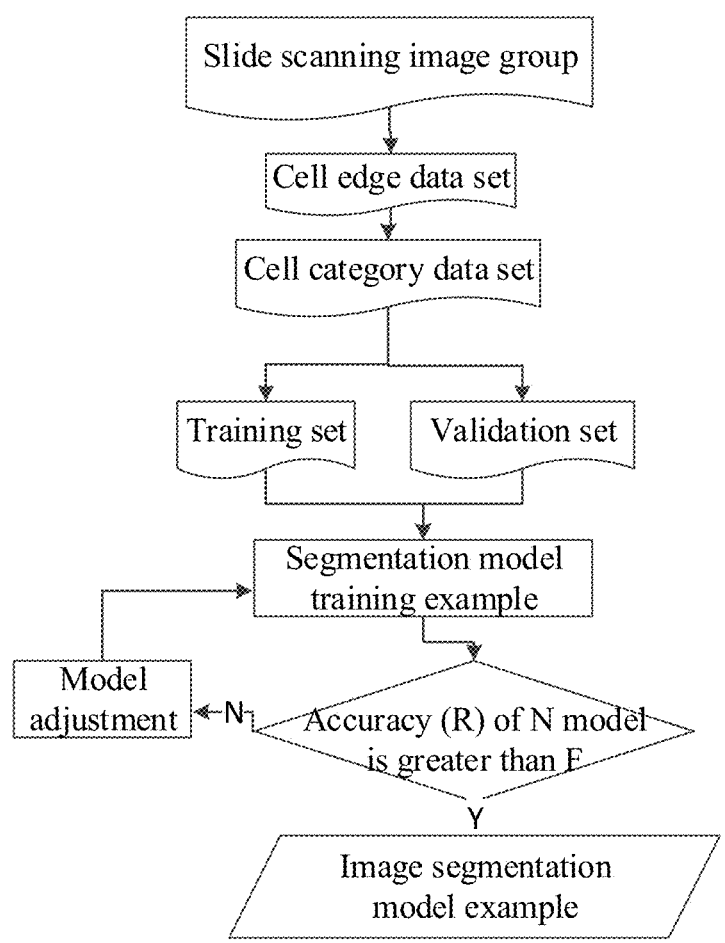
FIG. 15 is a flow chart of training of a blood cell recognition model.

With reference to FIG. 15, images with valid cell edge labeling are respectively selected from the sample set to form a cell edge data set; images with valid cell category labeling are selected to form a cell category data set; and the training sets and the validation sets are extracted respectively from the cell edge data set and the cell category data set to train the blood cell recognition model.

If the accuracy (R) of single edge segmentation obtained by the blood cell recognition model is greater than a set threshold F1 and the accuracy (R) of type judgment of the images is greater than a set threshold F2, the model training is completed and the model is packaged; otherwise, if any accuracy (R) does not satisfy the threshold requirements, the gradient is reversely transmitted to increase the accuracy (R), and the blood cell recognition model is adjusted.

In practical application, the input of the blood cell recognition model is a single-view blood smear image. Each pixel in the image is labeled, and each pixel corresponds to the category represented by the pixel. The labeled pixel-level image segmentation data set is trained to obtain the recognition model. The blood cells can be separated from the background and classified based on the network structure of the Fully Convolutional Neural Network (FCN). Segmentation and recognition use convolutional autoencoder structure. The core part of the network is mainly divided into two parts: encoder and decoder.

The encoder encodes the input images and extracts features; and the decoder decodes the extracted features and restores the image semantics.

Figure 16:
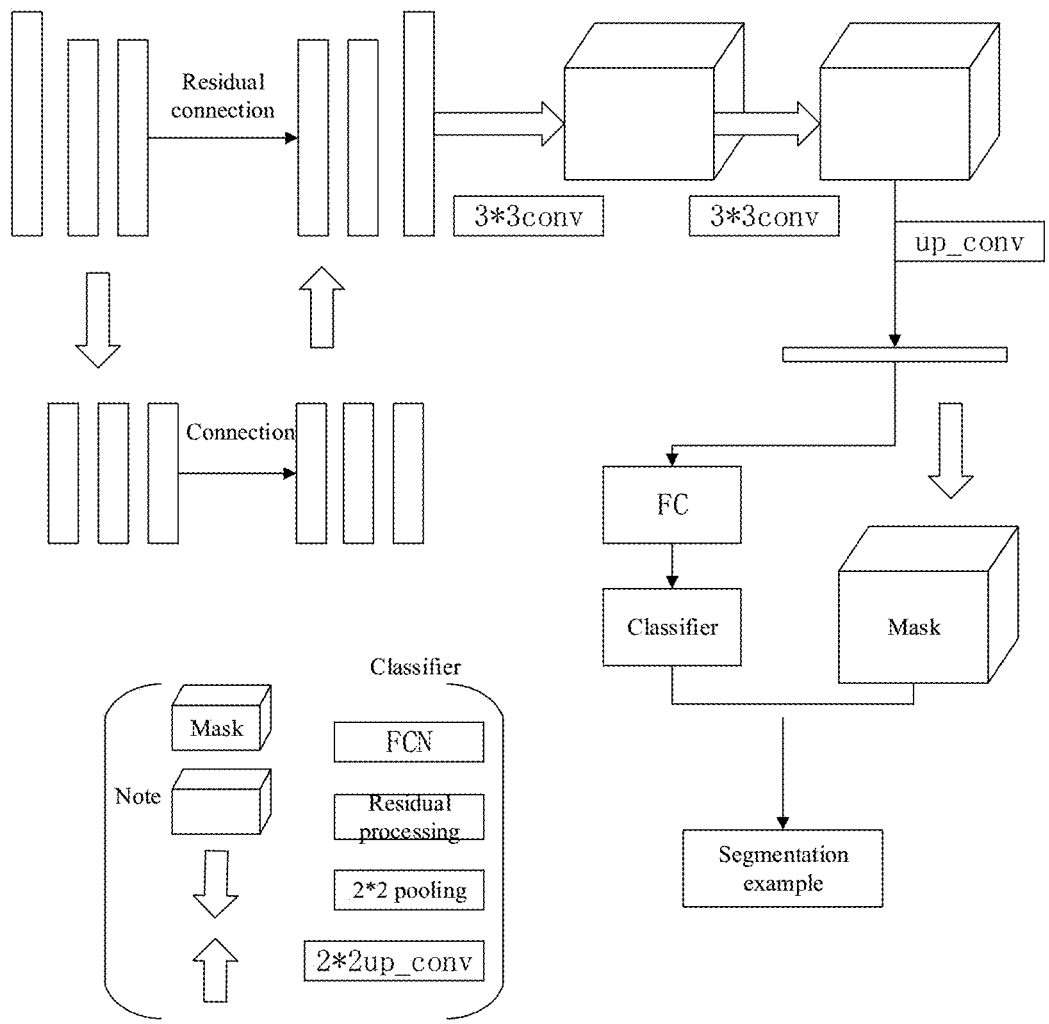
FIG. 16 is a schematic diagram of a blood cell recognition model in an embodiment.

FIG. 16 shows an embodiment of the blood cell recognition model based on the FCN. The network design uses the Encoder-Decoder architecture to extract the ROI feature map of the blood cell position regions, and uses the residual network to extract the features of the ROI feature map. Firstly, the Encoder conducts computation. The size of the input single-view blood smear image using the full convolutional network input is 572*572, and the double convolution computation (con) of kernel_size=3 is conducted on each layer. The number of channels is set as 100 to fully extract the shallow features, and then a max pooling computation of kernel_size=2 is conducted so that the network can extract the most critical features. Then, the convolution computation (up_conv) is conducted again to increase the number of the channels by 2 times, and the finally channel=300 according to this rule.

Subsequently, Decoder conducts decoding computation, firstly conducts an up_conv computation to upsample Decoder results, then conducts double convolution computations of kernel_size=3, and continues to extract the features to output a feature map (feature_map). At this moment, the potential region of the object to be segmented is obtained, and then the convolution computation is conducted on this region. The features are extracted, the residual block structure is used to design the deep network, and the learning residual is used to extract the features of the potential region, so that the gradient is more easily propagated backward, the vc dimension of the network is larger and a finer-grained feature map is obtained. The feature map is used for prediction. The fully connected network FC is connected behind the feature map to conduct regression of Bbox and target object classification tasks, and the outputs of the last fully connected layer are the coordinate and category of the object to be detected. A vectorized encoding mode is used here, that is, the coordinate value+number of categories+confidence. At the same time, the convolutional layer is connected behind the previously learned feature map; conv 1*1; channel=the number of target categories to be segmented; the mask of the object to be detected is obtained through the Mask algorithm, i.e., the edge information, and then the mask is fused with the category information obtained by the fully connected layer to obtain the result of the segmentation example. The Mask algorithm comprises acquiring the position and edge information corresponding to the feature map, conducting full convolutional neural network FCN processing, obtaining the type of each pixel, i.e., judging that each pixel belongs to a background pixel or a target pixel, conducting residual processing, obtaining a result after gradient transmission, conducting pooling, obtaining a vector after dimension reduction of the features, conducting convolution (2*2uP_conv), and finally obtaining the edge information corresponding to the blood cell at the position.

Figure 17:
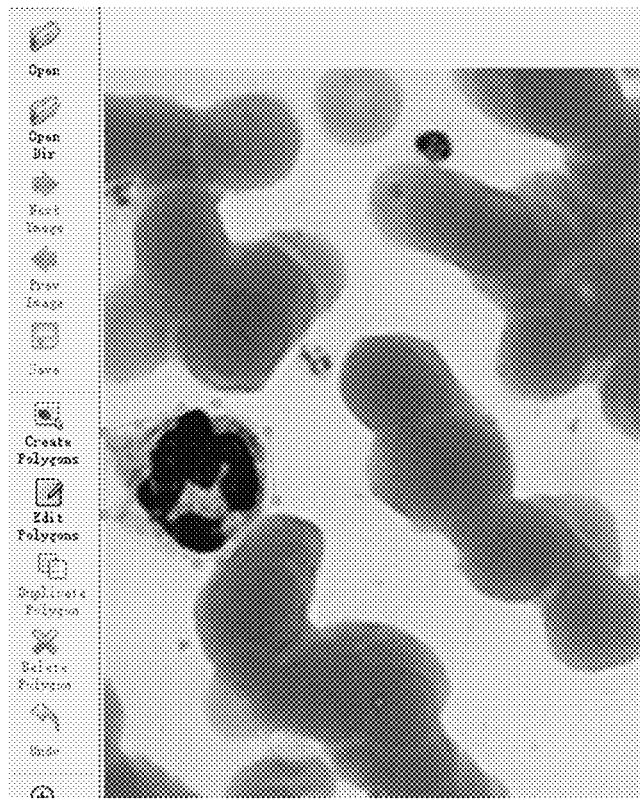
FIG. 17 is a schematic diagram of edge information labeling in an embodiment.
Figure 18:
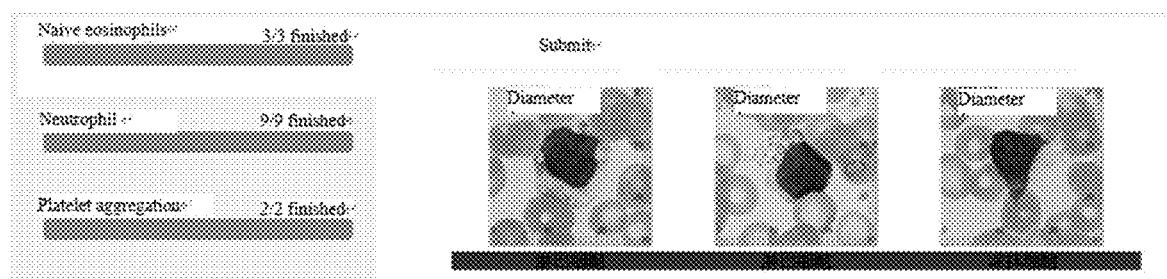
FIG. 18 is a schematic diagram of type labeling in an embodiment.
Figure 19:
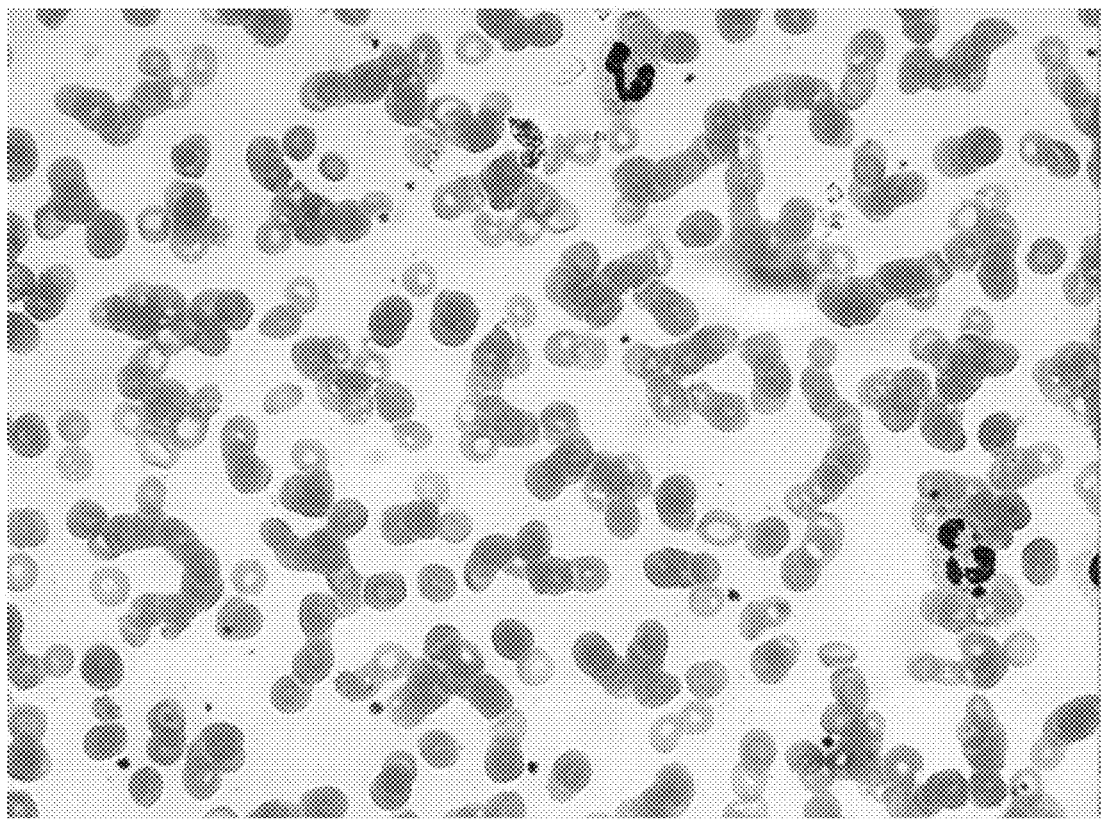
FIG. 19 is an image of a single-view blood smear.
Figure 20:
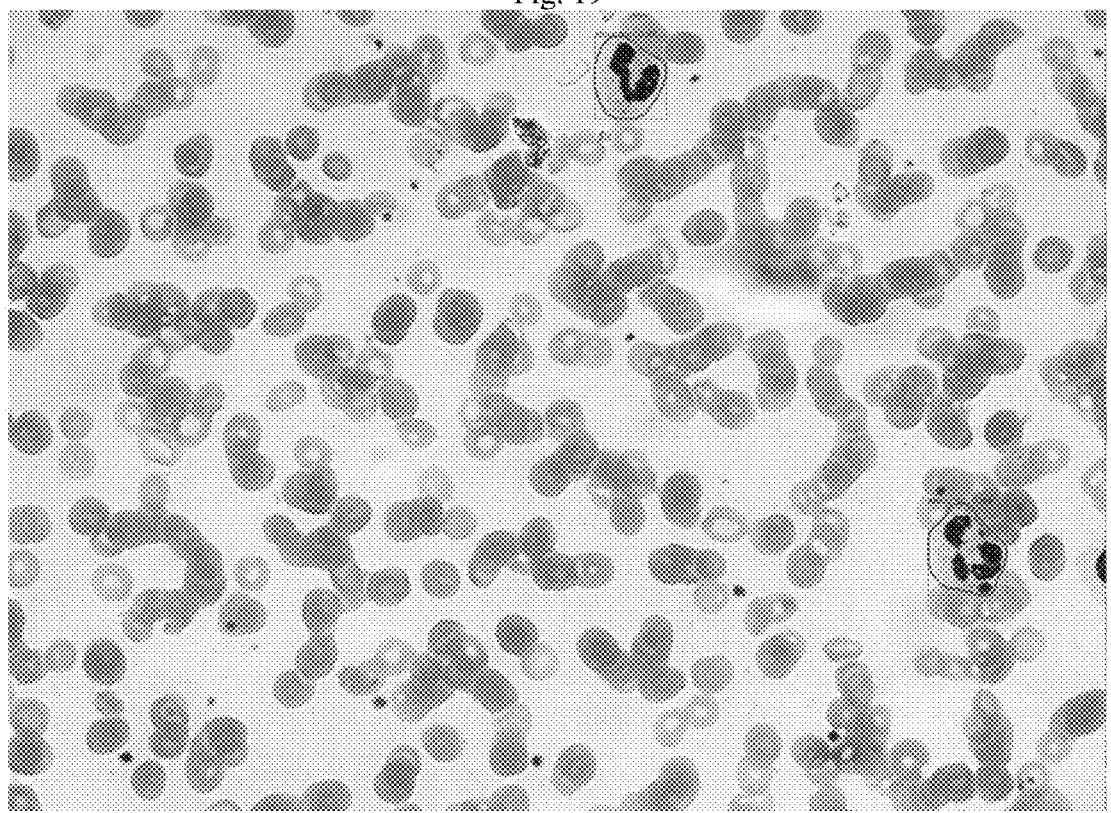
FIG. 20 is an image after labeling of FIG. 19.

In conjunction with FIG. 17, a schematic diagram of an edge information labeling result is shown, and the dotted lines in the figure represent the labeled edge information. FIG. 18 is a schematic diagram of the result of category labeling. The result of category labeling is shown below each blood cell picture. It can be seen that the edge information and category labeling of the present invention are clear and accurate. The position and category information and the edge information are used to label the scanned image of the single view slide to obtain the labeling result of the single-view blood smear, as shown in FIG. 20. The original image is shown in FIG. 19.

For slide imaging, a specific region that is ideal for imaging exists, which can provide high-quality image data. Some important parts, such as the head, middle, and tail of the slide, are the key distribution regions of the blood cells, and have great influence on the recognition results. In practice, doctors may be interested in some regions and possibly designate some regions. The present invention proposes the concept of full-view blood cell analysis for the first time. The full-view range comprises slide specific regions, designated regions and important parts of the slide, such as head, middle and tail, as well as the full slide range. Determination of the view range can be further increased at first before image input.

As an optional solution, manual assessment can be used in the practical application process of the blood cell recognition model to assess the results of edge labeling and category labeling of the blood cell recognition model and transmit the gradient reversely according to the assessment results to optimize the blood cell recognition model.

As an optional solution, the blood cell recognition model of the present invention can be loaded in the control equipment, such as intelligent single unit equipment, for example, a computer or smart phone.

The blood cell recognition model of the present invention can realize the labeling of at least 50 kinds of white blood cells and more than 20 kinds of red blood cells, and is trained according to actual needs, with good extensibility.

The present invention only needs to input the single-view blood smear image to output the recognition results, realizing end-to-end design. The present invention realizes the labeling of the blood cells based on the artificial intelligence algorithm. Compared with the traditional recognition method, the accuracy is qualitatively improved, and the recognition accuracy can reach more than 85%; and the full-view blood cells can be analyzed, which greatly improves the scientificity.

Those ordinary skilled in the art can understand that the above embodiments are specific embodiments for realizing the present invention. In practical application, various changes in form and detail can be made to the present invention without departing from the spirit and the scope of the present invention.

What is claimed is:

1. A blood smear full-view intelligent analysis method, comprising the following steps: collecting a plurality of original blood smear single-view images, establishing an original blood smear single-view image group, and establishing a blood smear full-view image based on the plurality of original blood smear single-view images;

obtaining a first training set and a first validation set based on the plurality of original blood smear single-view images, and constructing an image restoration model based on the first training set and the first validation set;

selecting the original blood smear single-view images in which white blood cells exist and the white blood cells and red blood cells do not overlap from the plurality of original blood smear single-view images to obtain a second training set and a second validation set, constructing an image segmentation model based on the second training set and the second validation set, processing the plurality of original blood smear single-view images in which white blood cells exist and the white blood cells and red blood cells do not overlap by the image segmentation model to obtain a plurality of segmented single blood cell images;

obtaining a third training set and a third validation set based on the plurality of segmented single blood cell images, and constructing an image recognition model based on the third training set and the third validation set;

restoring the blood smear full-view image by an image restoration model to obtain a restored full-view image, processing the restored full-view image by the image segmentation model to obtain a plurality of single blood cell images, and processing the plurality of single blood cell images by the image recognition model to obtain a blood cell classification result.

2. The method according to claim 1, wherein the step of selecting the original blood smear single-view images with in which white blood cells exist and the white blood cells and red blood cells do not overlap from the plurality of original blood smear single-view images to obtain a second training set and a second validation set, constructing an image segmentation model based on the second training set and the second validation set, processing the plurality of original blood smear single-view images in which white blood cells exist and the white blood cells and red blood cells do not overlap by the image segmentation model to obtain a plurality of segmented single blood cell images comprises:

step S310, outputting certain original blood smear single-view image data in the second training set into a convolutional block of a second convolutional neural network by an input layer of the second convolutional neural network;

step S320, setting the number of convolutional blocks of an encoding structure of the second convolutional neural network, the number of convolutional layers of each convolutional block, the number of pooling layers of each convolutional block, the number and size of convolutional kernels of each convolutional layer, and the number and size of the convolutional kernels of each pooling layer, and extracting first key features;

step S330, setting the number of convolutional blocks of a decoding structure same with the number of convolutional blocks of the encoding structure, making the number and size of convolutional kernels of convolutional layers of each convolutional block of the decoding structure, the number of pooling layers of each convolutional block of the decoding structure and the number of convolutional kernels of each pooling layer of the decoding structure consistent with the corresponding convolutional blocks in the encoding structure, and obtaining decoded data based on the first key features;

step S340, performing convolution computation on the decoded data, making the size of convolutional kernels of the convolution computation as 1, and setting the number of the convolutional kernels as the number of types to be segmented;

step S350, fully connecting the decoded data subjected to the convolution computation with a plurality of neurons in an output layer of the second convolutional neural network by a fully connected layer of each convolutional block of the second convolutional neural network; and outputting a predicted segmentation result by the output layer of the second convolutional neural network;

step S360, repeating steps S310 to S350, using the second training set for training, and obtaining the image segmentation model through iterative parameter adjustment.

3. The method according to claim 2, wherein the step of obtaining a third training set and a third validation set based on the plurality of segmented single blood cell images, and constructing an image recognition model based on the third training set and the third validation set comprises:

step S410, outputting certain segmented single blood cell image data in the third training set into a convolutional block of a third convolutional neural network by an input layer of the third convolutional neural network;

step S420, setting the number of convolutional blocks of the third convolutional neural network, the number of convolutional layers of each convolutional block, the number of pooling layers of each convolutional block, the number and size of convolutional kernels of each convolutional layer, and the number and size of the convolutional kernels of each pooling layer, and extracting second key features;

step S430, fully connecting the second key features with a plurality of neurons in an output layer of the third convolutional neural network by a fully connected layer of each convolutional block of the third convolutional neural network; and outputting a predicted recognition result by the output layer of the third convolutional neural network;

step S440, repeating steps S410 to S430, using the third training set for training, and obtaining the image recognition model through iterative parameter adjustment.

4. The method according to claim 3, wherein the size of the convolutional kernel in each convolutional layer of the encoding structure of the second convolutional neural network is the same, the number of the convolutional kernels of each convolutional layer of a next convolutional block of the encoding structure is twice the number of the convolutional kernels of each convolutional layer of a previous convolutional block, the number of the pooling layers of each convolutional block of the encoding structure is the same, and the number and size of the convolutional kernels of each pooling layer of the encoding structure are the same.

5. The method according to claim 4, wherein the size of the convolutional kernel in each convolutional layer of the decoding structure of the second convolutional neural network is the same, the number of the convolutional kernels of each convolutional layer of a next convolutional block of the decoding structure is ½ times of the number of the convolutional kernels of each convolutional layer of a previous convolutional block, the number of the pooling layers of each convolutional block of the decoding structure is the same, and the number and size of the convolutional kernels of each pooling layer of the decoding structure are the same.

\* \* \* \* \*